(12) United States Patent
Shirakawa

(10) Patent No.: US 10,744,752 B2
(45) Date of Patent: Aug. 18, 2020

(54) INFORMATION PROCESSING APPARATUS FOR AUTOMATICALLY DETERMINING SETTINGS TO BE USED FOR MOLDING OF THREE-DIMENSIONAL OBJECT, CONTROL METHOD FOR THE INFORMATION PROCESSING APPARATUS, AND STORAGE MEDIUM

(71) Applicant: CANON KABUSHIKI KAISHA, Tokyo (JP)

(72) Inventor: Yuki Shirakawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 103 days.

(21) Appl. No.: 15/409,272

(22) Filed: Jan. 18, 2017

(65) Prior Publication Data
US 2017/0210116 A1    Jul. 27, 2017

(30) Foreign Application Priority Data

Jan. 26, 2016   (JP) ................................ 2016-012871

(51) Int. Cl.
*B33Y 50/02*    (2015.01)
*B29C 64/393*    (2017.01)
(Continued)

(52) U.S. Cl.
CPC ............ *B33Y 50/02* (2014.12); *B29C 64/393* (2017.08); *G05B 19/042* (2013.01); *G06F 30/17* (2020.01);
(Continued)

(58) Field of Classification Search
CPC .............................. B33Y 50/02; G05B 19/042
See application file for complete search history.

(56) References Cited

U.S. PATENT DOCUMENTS 7,087,109 B2 *   8/2006   Bredt ...................... C04B 28/14
                                                         106/31.13
8,414,280 B2 *   4/2013   Pettis ........................ G06F 3/12
                                                         264/308
(Continued)

FOREIGN PATENT DOCUMENTS

CN        102470610 A       5/2012
CN        104136199 A       11/2014
(Continued)

OTHER PUBLICATIONS

Simplify3D Quick Start Guide v3 [online]. Simplify3D, 2015 [retrieved on Apr. 26, 2018]. Retrieved from the Internet:<URI:https://www.simplify3d.com/wp-content/uploads/2015/06/S3D-Quick-Start-Guide-v3.pdf>.*

(Continued)

*Primary Examiner* — Robert E Fennema
*Assistant Examiner* — Jonathan Michael Skrzycki
(74) *Attorney, Agent, or Firm* — Canon U.S.A., Inc. IP Division

(57) ABSTRACT

An information processing apparatus includes a provision unit configured to provide a screen via which a plurality of condition items indicating features of a three-dimensional object can be specified, a reception unit configured to receive, via the screen, a specification of a condition item indicating an feature of an object desired to be molded by a user, and a determination unit configured to determine settings to be used for molding of the object desired to be molded by the user, based on the received specification of the condition item, wherein the settings to be used for the molding determined by the determination unit include molding settings for molding specified with respect to a molding apparatus.

18 Claims, 18 Drawing Sheets

(51) Int. Cl.
*G06F 30/17* (2020.01)
*G05B 19/042* (2006.01)
*G06F 113/22* (2020.01)

(52) U.S. Cl.
CPC ............... *G05B 2219/2624* (2013.01); *G05B 2219/49023* (2013.01); *G06F 2113/22* (2020.01)

(56) References Cited

U.S. PATENT DOCUMENTS

| | | | | |
|---|---|---|---|---|
| 2006/0127153 | A1* | 6/2006 | Menchik | B41J 2/175 400/62 |
| 2014/0129020 | A1 | 5/2014 | Kroner | |
| 2014/0236335 | A1 | 8/2014 | Lewis | |
| 2014/0277659 | A1* | 9/2014 | Kumar | G05B 19/4097 700/97 |
| 2015/0079362 | A1* | 3/2015 | Yang | C08F 267/06 428/209 |
| 2016/0085882 | A1* | 3/2016 | Li | G06F 17/50 703/1 |
| 2016/0092041 | A1* | 3/2016 | Pickens | G06F 3/04815 715/771 |
| 2016/0167310 | A1* | 6/2016 | Lee | B29C 67/0088 700/98 |
| 2016/0209819 | A1* | 7/2016 | Cudak | G05B 15/02 |
| 2016/0210312 | A1* | 7/2016 | Webb | G06Q 30/0635 |
| 2016/0283833 | A1* | 9/2016 | Peek | G06K 15/408 |
| 2017/0072639 | A1* | 3/2017 | Levine | H04N 1/00827 |
| 2017/0080643 | A1* | 3/2017 | Premakumar | G06T 17/00 |
| 2017/0123407 | A1* | 5/2017 | Shiihara | B33Y 10/00 |
| 2017/0261965 | A1* | 9/2017 | Shiihara | G05B 19/4099 |

FOREIGN PATENT DOCUMENTS

| | | |
|---|---|---|
| CN | 104156183 A | 11/2014 |
| CN | 104203547 A | 12/2014 |
| CN | 105204791 A | 12/2015 |
| JP | 2010-117915 A | 5/2010 |

OTHER PUBLICATIONS

Screen captures from YouTube video clip entitled "Adding Material and Quality Options | Simplify3D" 8 pages, uploaded on Jul. 10, 2015 by user "Simplify3D". Retrieved from Internet:<https://www.youtube.com/watch?v=JFynhtvPBPQ>.*

Screen captures from YouTube video clip entitled "Infill Pattern Basics | Simplify3D" 1 page, uploaded on Nov. 3, 2015 by user "Simplify3D". Retrieved from Internet:<https://www.youtube.com/watch?v=BMWTK2ZgJCM>.*

Screen captures from YouTube video clip entitled "Simplify3D—dual extrusion wizard", 1 page, uploaded on Jul. 9, 2015 by user "Simplify3D". Retrieved from Internet: <https://www.youtube.com/watch?v=qPufaJhyqME> (Year: 2015).*

Transcript from YouTube video clip entitled "Simplify3D—dual extrusion wizard transcript", 5 pages, uploaded on Jul. 9, 2015 by user "Simplify3D". Retrieved from Internet: <https://www.youtube.com/watch?v=qPufaJhyqME> (Year: 2015).*

Screen captures from YouTube video clip entitled "Simplify3D—managing printer profiles", 1 page, uploaded on Jun. 25, 2015 by user "Simplify3D". Retrieved from Internet: <https://www.youtube.com/watch?v=eZ7HFPY1wog> (Year: 2015).*

Transcript from YouTube video clip entitled "Simplify3D—managing printer profiles transcript", 4 pages, uploaded on Jun. 25, 2015 by user "Simplify3D". Retrieved from Internet: <https://www.youtube.com/watch?v=eZ7HFPY1wog> (Year: 2015).*

\* cited by examiner

FIG.5

| PRINTER NAME | MOLDING METHOD | NUMBER OF COLORS | MOLDING SPEED | ACCURACY | MOLDING MATERIAL | ... |
|---|---|---|---|---|---|---|
| FDM_001 | FDM | 3 | 50 | 60 | [PLASTIC 1, PLASTIC 2, PLASTIC 3] | ... |
| FDM_002 | FDM | 1 | 60 | 60 | [PLASTIC 1, PLASTIC 2, PLASTIC 3] | ... |
| SLS_001 | SLS | 2 | 30 | 80 | [METAL 1, METAL 2, METAL 3] | ... |
| SLS_002 | SLS | 2 | 40 | 80 | [METAL 4, METAL 5, METAL 6] | ... |
| SLA_001 | SLA | 1 | 70 | 70 | [PLASTIC 4, PLASTIC 5] | ... |
| SLA_002 | SLA | 3 | 60 | 70 | [PLASTIC 4, PLASTIC 5] | ... |
| IJ_001 | IJ | 5 | 100 | 100 | [PLASTIC 1, PLASTIC 4, RUBBER 1, RUBBER 2] | ... |
| ... | | | | | ... | ... |

| MOLDING MATERIAL NAME (601) | STRENGTH (602) | TACTILE SENSATION (603) | WATER RESISTANT (604) | HEAT RESISTANT (605) | LIGHT RESISTANT | COLOR (606) | COST (607) | ... |
|---|---|---|---|---|---|---|---|---|
| PLASTIC 1 | 20 - 35 | TACTILE SENSATION 1 | 80 | 10 | 0 | BLUE | 20 | ... |
| PLASTIC 2 | 35 - 40 | TACTILE SENSATION 1 | 90 | 0 | 20 | BLUE | 10 | ... |
| PLASTIC 3 | 20 - 30 | TACTILE SENSATION 1 | 70 | 20 | 20 | BLUE | 30 | ... |
| ⋮ | ⋮ | ⋮ | ⋮ | ⋮ | ⋮ | ⋮ | ⋮ | ⋮ |
| METAL 1 | 30 - 40 | TACTILE SENSATION 2 | 20 | 80 | 90 | SILVER | 80 | ... |
| METAL 2 | 80 - 95 | TACTILE SENSATION 2 | 30 | 80 | 80 | SILVER | 70 | ... |
| METAL 3 | 90 - 95 | TACTILE SENSATION 3 | 70 | 80 | 90 | SILVER | 50 | ... |
| ⋮ | ⋮ | ⋮ | ⋮ | ⋮ | ⋮ | ⋮ | ⋮ | ⋮ |
| RUBBER 1 | 10 - 60 | TACTILE SENSATION 4 | 90 | 5 | 20 | GRAY | 40 | ... |
| ⋮ | ⋮ | ⋮ | ⋮ | ⋮ | ⋮ | ⋮ | ⋮ | ⋮ |

FIG.6B

| MOLDING MATERIAL NAME (611) | STRENGTH (612) | TACTILE SENSATION (613) | WATER RESISTANT (614) | HEAT RESISTANT (615) | LIGHT RESISTANT | COLOR (616) | COST (617) | ... |
|---|---|---|---|---|---|---|---|---|
| PLASTIC 1 | 20 - 35 | TACTILE SENSATION 1 | 80 | 10 | 0 | BLUE | 20 | ... |
| PLASTIC 2 | 25 - 40 | TACTILE SENSATION 1 | 90 | 0 | 20 | BLUE | 10 | ... |
| PLASTIC 3 | 20 - 30 | TACTILE SENSATION 1 | 70 | 20 | 20 | BLUE | 30 | ... |
| METAL 1 | 30 - 40 | TACTILE SENSATION 2 | 20 | 80 | 90 | SILVER | 80 | ... |
| METAL 2 | 80 - 95 | TACTILE SENSATION 2 | 30 | 80 | 80 | SILVER | 70 | ... |
| METAL 3 | 90 - 95 | TACTILE SENSATION 3 | 70 | 80 | 90 | SILVER | 50 | ... |
| RUBBER 1 | 10 - 60 | TACTILE SENSATION 4 | 90 | 5 | 20 | GRAY | 40 | ... |
| RUBBER 2 | 20 - 50 | TACTILE SENSATION 4 | 80 | 5 | 30 | BLACK | 30 | ... |
| PLASTER 1 | 30 - 40 | TACTILE SENSATION 1 | 5 | 30 | 50 | WHITE | 60 | ... |
| PLASTER 2 | 70 - 90 | TACTILE SENSATION 1 | 20 | 30 | 20 | WHITE | 50 | ... |

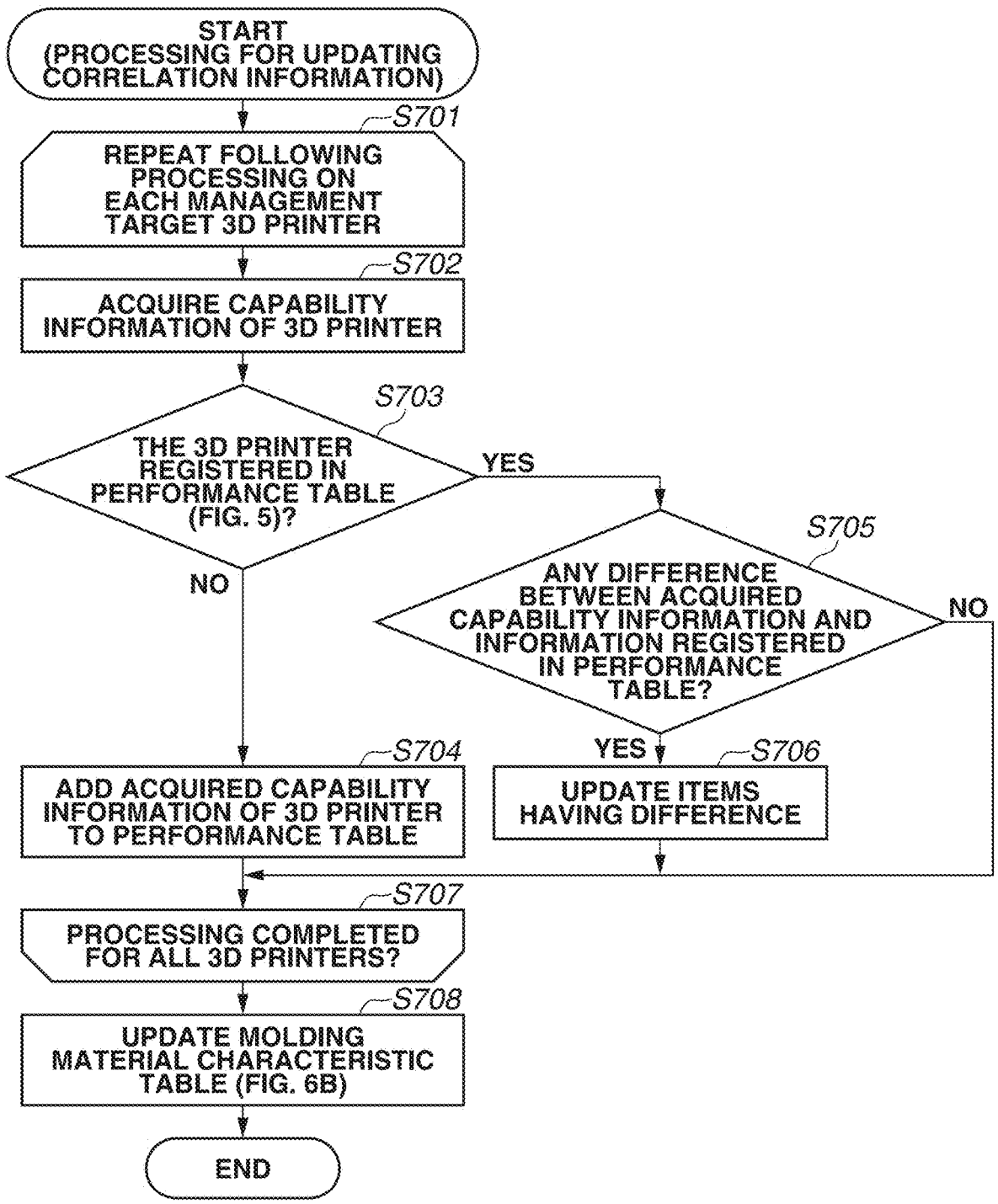

FIG.8

SIMPLIFIED SETTING SCREEN

3D PRINTER SPECIFICATION
☐ SPECIFY 3D PRINTER TO BE USED  [ 3D-Advance1234 - FDM_001 ▼ ]

3D MODEL DATA SPECIFICATION
☑ SPECIFY 3D MODEL DATA  [ sample.3d ]
[ BROWSE... ]

CONDITION SPECIFICATION

● SPECIFY BY USAGE
[ FIGURE ▼ ]

○ SPECIFY BY COMPLETION IMAGE

ALLOWABLE ACCURACY: ○ HIGH  ● MIDDLE  ○ LOW
STRENGTH: ○ ROBUST  ● NORMAL  ○ FLEXIBLE  ○ NOT CARE
TACTILE SENSATION: ● SLICK  ○ COARSE  ○ SMOOTH  ○ NOT CARE
RESISTANCES: ☑ WATER RESISTANT  ☐ HEAT RESISTANT  ☑ LIGHT RESISTANT  ☐ ACID RESISTANT

COLOR: ○ MONOCHROME  ● MULTI-COLOR
[ WHITE ▼ ]
[ RED ▼ ]  [ DELETE ]
[ ADD ]

[ SEARCH ]

| 3D PRINTER NAME | MOLDING METHOD | MOLDING MATERIAL | FINISHING | REQUISITE TIME | COST | |
|---|---|---|---|---|---|---|
| FDM_001 | FUSED DEPOSITION MODELING | ABS RESIN | ○ | △ | ◎ | [DETAILS] |
| SLA_001 | STEREO LITHOGRAPH | PHOTOCURABLE RESIN | ○ | ○ | ○ | [DETAILS] |
| SLA_002 | STEREO LITHOGRAPH | PHOTOCURABLE RESIN | ◎ | △ | ○ | [DETAILS] |
| SLS_001 | SELECTIVE LASER SINTERING | NYLON POWDER | ○ | ○ | △ | [DETAILS] |
| SLS_002 | SELECTIVE LASER SINTERING | NYLON POWDER | ◎ | △ | △ | [DETAILS] |

DETAILED SETTING SCREEN

3D PRINTER

[ 3D-Advance1234 - FDM_001 ▼ ] —*902*

3D MODEL DATA

*904*

*903*— [ sample.3d ] [ BROWSE... ]

RESOLUTION

*905* {
○ LOW (FAST)
● STANDARD
○ HIGH (SLOW)
}

SELECTION OF MOLDING MATERIALS

| | |
|---|---|
| LEFT HEAD | [ ABS RESIN - WHITE ▼ ] |
| RIGHT HEAD | [ PLA RESIN - RED ▼ ] |
| SUPPORT STRUCTURES | [ WATER-SOLUBLE SUPPORT STRUCTURE MATERIALS ▼ ] |

—*906*

PARAMETER SETTINGS

| | | |
|---|---|---|
| BED SIZE (mm) | X [ 50 ] | Y [ 100 ] |
| CENTRAL POSITION (mm) | X [ 25 ] | Y [ 50 ] |
| PRINT HEAD TEMPERATURE | | [ 200 ] |
| PRINTING SPEED (mm/second) | | [ 30 ] |
| LAYER THICKNESS (mm) | | [ 0.20 ] |
| FILLING DENSITY (%) | | [ 100 ] |
| FILLING PATTERN | | [ Rectilinear ▼ ] |

—*907*

[ MOLDING ]   [ CANCEL ]

3D PRINTER DISPLAY SCREEN

3D PRINTER SPECIFICATION

☐ SPECIFY 3D PRINTER TO BE USED  [3D-Advance1234 - FDM_001 ▼]

3D MODEL DATA SPECIFICATION

☑ SPECIFY 3D MODEL DATA  [sample.3d]

[BROWSE...]

CONDITION SPECIFICATION

● SPECIFY BY USAGE

[FIGURE ▼]

○ SPECIFY BY COMPLETION IMAGE

- ALLOWABLE ACCURACY: ○ HIGH ● MIDDLE ○ LOW
- STRENGTH: ○ ROBUST ● NORMAL ○ FLEXIBLE ○ NOT CARE
- TACTILE SENSATION: ● SLICK ○ COARSE ○ SMOOTH ○ NOT CARE
- RESISTANCES: ☑ WATER RESISTANT ☐ HEAT RESISTANT ☑ LIGHT RESISTANT ☐ ACID RESISTANT
- COLOR: ○ MONOCHROME ● MULTI-COLOR

[WHITE ▼]
[RED ▼] [DELETE]
[ADD]

[SEARCH]

| 3D PRINTER NAME | MOLDING METHOD | MOLDING MATERIAL | FINISHING | REQUISITE TIME | COST | |
|---|---|---|---|---|---|---|
| SLA_001 | STEREO LITHOGRAPH | PHOTOCURABLE RESIN | ○ | △ | ○ | [DETAILS] |
| SLA_001 + CURING APPARATUS 1 | STEREO LITHOGRAPH | PHOTOCURABLE RESIN | ○ | ◎ (GOOD) | ○ | [DETAILS] |
| SLS_001 | SELECTIVE LASER SINTERING | NYLON POWDER | ○ | △ | ○ | [DETAILS] |
| SLS_002 + CLEANING APPARATUS 1 | SELECTIVE LASER SINTERING | NYLON POWDER | ◎ (GOOD) | ○ | △ (BAD) | [DETAILS] |

FIG.13

3D PRINTER SEARCH

3D PRINTER SPECIFICATION

☐ SPECIFY 3D PRINTER TO BE USED — [3D-Advance1234 - FDM_001 ▼]

3D MODEL DATA SPECIFICATION

☑ SPECIFY 3D MODEL DATA — [sample.3d]  [BROWSE...]

CONDITION SPECIFICATION

○ SPECIFY BY USAGE
   [FIGURE ▼]

○ SPECIFY BY COMPLETION IMAGE

| | | | | |
|---|---|---|---|---|
| ALLOWABLE ACCURACY: | ○ HIGH | ● MIDDLE | ○ LOW | |
| STRENGTH: | ○ ROBUST | ● NORMAL | ○ FLEXIBLE | ○ NOT CARE |
| TACTILE SENSATION: | ● SLICK | ○ COARSE | ○ SMOOTH | ○ NOT CARE |
| RESISTANCES: | ☑ WATER RESISTANT | ☐ HEAT RESISTANT | ☑ LIGHT RESISTANT | ☐ ACID RESISTANT |

COLOR: ● MONOCHROME  ○ MULTI-COLOR
[WHITE ▼]
[ADD]

[SEARCH]

| 3D PRINTER NAME | MOLDING METHOD | MOLDING MATERIAL | FINISHING | REQUISITE TIME | COST | |
|---|---|---|---|---|---|---|
| FDM_002 | FUSED DEPOSITION MODELING | ABS RESIN | △ | ○ | ◎ | [DETAILS] |
| FDM_002 | FUSED DEPOSITION MODELING | ABS RESIN | △ | ○ | ◎ | [DETAILS] |
| FDM_002 | FUSED DEPOSITION MODELING | PLA RESIN | ○ | ○ | ○ | [DETAILS] |

FIG.15

3D PRINTER DISPLAY SCREEN

3D PRINTER SPECIFICATION

☐ SPECIFY 3D PRINTER TO BE USED  [3D-Advance1224 - FDM_001 ▼]

3D MODEL DATA SPECIFICATION

☑ SPECIFY 3D MODEL DATA  [sample.3d]

[BROWSE...]

CONDITION SPECIFICATION

● SPECIFY BY USAGE

[FIGURE ▼]

○ SPECIFY BY COMPLETION IMAGE

ALLOWABLE ACCURACY: ○ HIGH ● MIDDLE ○ LOW
STRENGTH: ○ ROBUST ● NORMAL ○ FLEXIBLE ○ NOT CARE
TACTILE SENSATION: ● SLICK ○ COARSE ○ SMOOTH ○ NOT CARE
RESISTANCES: ☑ WATER RESISTANT ☐ HEAT RESISTANT ☑ LIGHT RESISTANT ☐ ACID RESISTANT
COLOR: ○ MONOCHROME ● MULTI-COLOR

[WHITE ▼]
[RED ▼] [DELETE]
[ADD]

*1502* — MOLDING IS POSSIBLE IF MOLDING MATERIAL IS REPLENISHED.

*1503* — [SEARCH]

| 3D PRINTER NAME | MOLDING METHOD | MOLDING MATERIAL | FINISHING | REQUISITE TIME | COST | |
|---|---|---|---|---|---|---|
| ⚠ FDM_001 | FUSED DEPOSITION MODELING | ABS RESIN | ○ | △ | ◎ | [DETAILS] |
| SLS_001 | SELECTIVE LASER SINTERING | NYLON POWDER | ○ | ○ (GOOD) | △ | [DETAILS] |
| ⚠ SLA_001 | STEREO LITHOGRAPH | PHOTOCURABLE RESIN | ○ | ○ | ○ | [DETAILS] |

*1501*, *1501*

*1502* — ALTHOUGH ULTRAVIOLET CURING LAMP IS DAMAGED, MOLDING IS POSSIBLE IF "ADDITIONAL APPARATUS_001" IS USED.

WARM-UP IS COMPLETED. MOLDING CAN BE IMMEDIATELY STARTED.

INFORMATION PROCESSING APPARATUS FOR AUTOMATICALLY DETERMINING SETTINGS TO BE USED FOR MOLDING OF THREE-DIMENSIONAL OBJECT, CONTROL METHOD FOR THE INFORMATION PROCESSING APPARATUS, AND STORAGE MEDIUM

BACKGROUND OF THE INVENTION

Field of the Invention

The present disclosure relates to an information processing apparatus for molding a three-dimensional object with a molding apparatus, a control method therefor, and a storage medium.

Description of the Related Art

Molding apparatuses for molding three-dimensional objects (solid objects) based on model data are generally referred to as three-dimensional (3D) printers, and recent years have seen a rapid increase in the use of the 3D printers. Techniques related to solid structures are also referred to as Additive Manufacturing. Meanwhile, two-dimensional (2D) printers are printing apparatuses for performing planar printing on paper (sheets).

Although 3D printers themselves have been previously known, those prior 3D printers had been used only in limited industries such as manufacturing industries since those 3D printers are large and require spaces, are difficult to handle, and cost high. However, with the diversifying molding methods and materials, a variety of 3D printers are commercially available nowadays, ranging from inexpensive 3D printers usable by general consumers to high performance business-use 3D printers for companies in manufacturing industries and other diverse industries.

Examples of molding methods employed by 3D printers include Fused Deposition Modeling (FDM), Stereo Lithography (STL), Selective Laser Sintering (SLS), and an ink-jet method. Molding materials corresponding to these molding methods are used to mold objects.

In this regard, in the field of 2D printers such as office-use printers, as a function of a printer driver, with which printing-related settings are made, a user interface (UI) screen for simplified settings that enables input of a part of setting items among all of setting items may be provided. Japanese Patent Application Laid-Open No. 2010-117915 discusses a printer driver that provides, when a user specifies a purpose of printing, a UI screen that reflects some of setting items and specific setting values corresponding to the purpose of printing. For example, purposes of printing include normal printing, document printing, saving printing, and photographic printing, and the printer driver manages setting items and setting values for each purpose of printing.

Features of finishing such as the strength of a three-dimensional object molded by a 3D printer depend on molding settings specified with respect to a molding apparatus when molding is to be performed. It is thought to be difficult for a user who is unfamiliar with a 3D printer to specify various molding-related settings in consideration of such features as the strength of a molding target object via existing setting screens of molding control software for generating molding data. Further, in molding by using 3D printers, materials differ depending on the type of a molding material to be used for molding, and molding methods differ depending on the type of a molding material and the model of a molding apparatus. Thus, features of a resultant molded object will be completely different. In other words, it is necessary to select a suitable molding material, a suitable molding apparatus, and a suitable molding method in consideration of such features as the strength of an object desired to be molded. However, it is difficult for a user who is unfamiliar with 3D printers to select a suitable molding material, a suitable molding apparatus, and a suitable molding method.

The aforementioned Japanese Patent Application Laid-Open No. 2010-117915 neither considers 3D printers nor discusses techniques for prompting a user to select a 3D printer suitable for features of an object desired to be molded and prompting a user to make suitable settings to be used for molding, such as molding materials, molding methods, and molding settings.

SUMMARY OF THE INVENTION

The present disclosure is directed to an information processing apparatus for determining settings to be used for molding that are suitable for features of a three-dimensional object desired to be molded by a user, to a control method, and to a storage medium.

According to an aspect of the present disclosure, an information processing apparatus includes a provision unit configured to provide a screen via which a plurality of condition items indicating features of a three-dimensional object can be specified, a reception unit configured to receive, via the screen, a specification of a condition item indicating an feature of an object desired to be molded by a user, and a determination unit configured to determine settings to be used for molding of the object desired to be molded by the user, based on the received specification of the condition item, wherein the settings to be used for the molding determined by the determination unit include molding settings for molding specified with respect to a molding apparatus.

Further features of the present invention will become apparent from the following description of exemplary embodiments with reference to the attached drawings.

BRIEF DESCRIPTION OF THE DRAWINGS

FIG. 5 illustrates an example of a 3D printer performance table.

FIGS. 6A and 6B illustrate examples of molding material characteristic correlation information tables.

FIG. 7 is a flowchart illustrating an example procedure of processing for updating correlation information.

FIG. 8 illustrates an example of a screen user interface (UI) for simplified settings.

FIG. 9 illustrates an example of a screen UI for detailed settings.

FIG. 11 illustrates an example of a screen UI for a 3D printer screen displayed in consideration of an additional apparatus.

FIG. 13 illustrates an example of a screen UI displayed when a 3D printer or 3D model data is specified.

FIG. 15 illustrates an example of a screen UI displayed in consideration of statuses.

DESCRIPTION OF THE EMBODIMENTS

Exemplary embodiments of the present disclosure will be described below with reference to the accompanying drawings.

Figure 1:
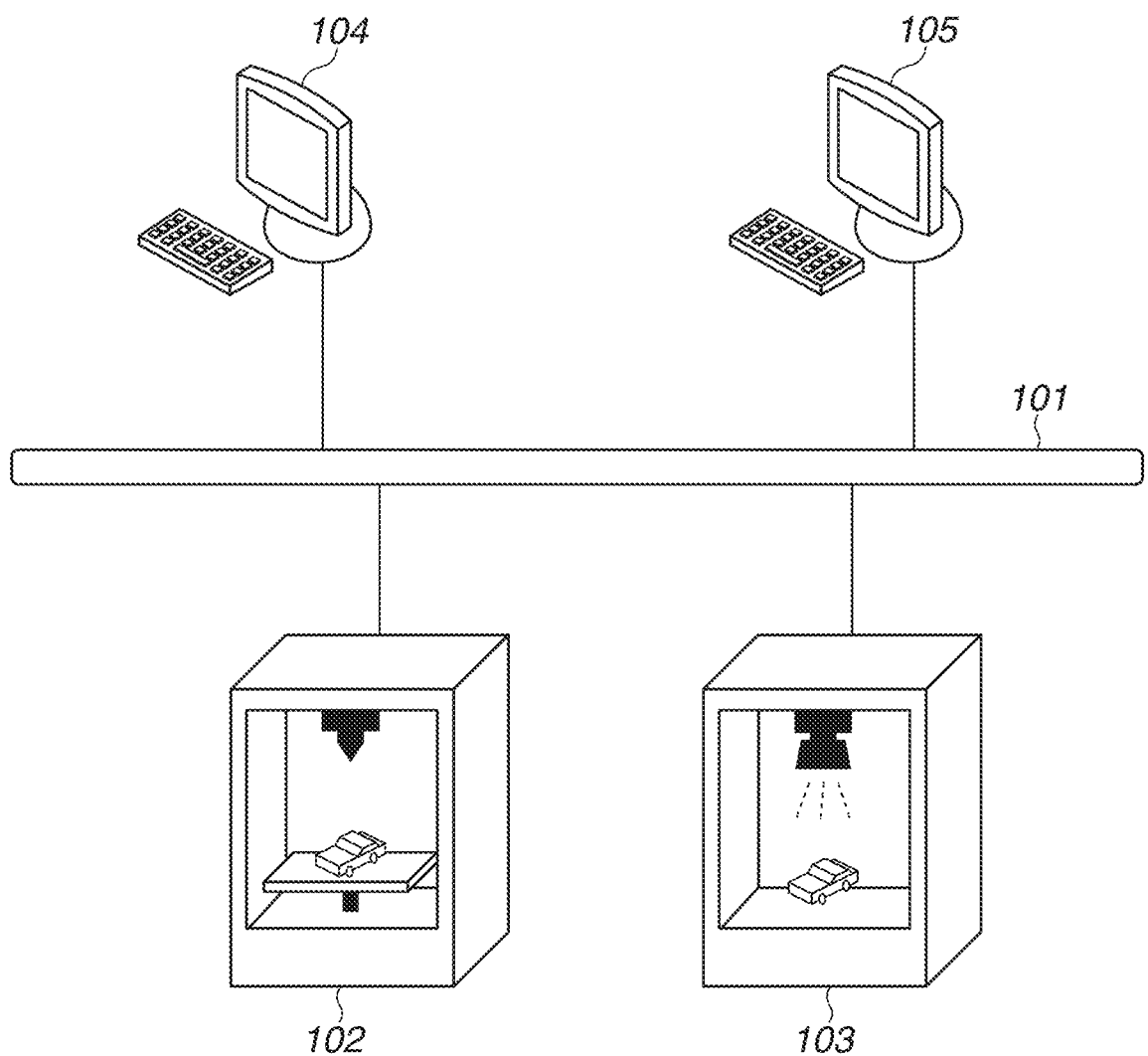
FIG. 1 illustrates an example of a system configuration and a network configuration.

FIG. 1 illustrates an example of a system configuration and a network configuration according to a first exemplary embodiment of the present disclosure.

A network 101 is an intranet or a local area network (hereafter referred to as a LAN). A 3D printer 102 is an example of a control apparatus for molding an object (solid object) based on three-dimensional model data. An additional apparatus 103 is, for example, a dust-proofing apparatus, a cleaning apparatus, and a curing apparatus for performing processing required during or after molding by the 3D printers 102. The additional apparatus 103 may be or may not be connected to the network 101. Computers 104 and 105 are various types of computers such as personal computers, tablet computers, and smart phones. The 3D printer 102, the additional apparatus 103, and the computers 104 and 105 are able to perform transmission and reception of information with each other via the network 101. The network 101 may be a wireless network such as a wireless LAN. The network 101 may also be a public network such as the Internet as long as transmission and reception of information are possible.

Figure 2:
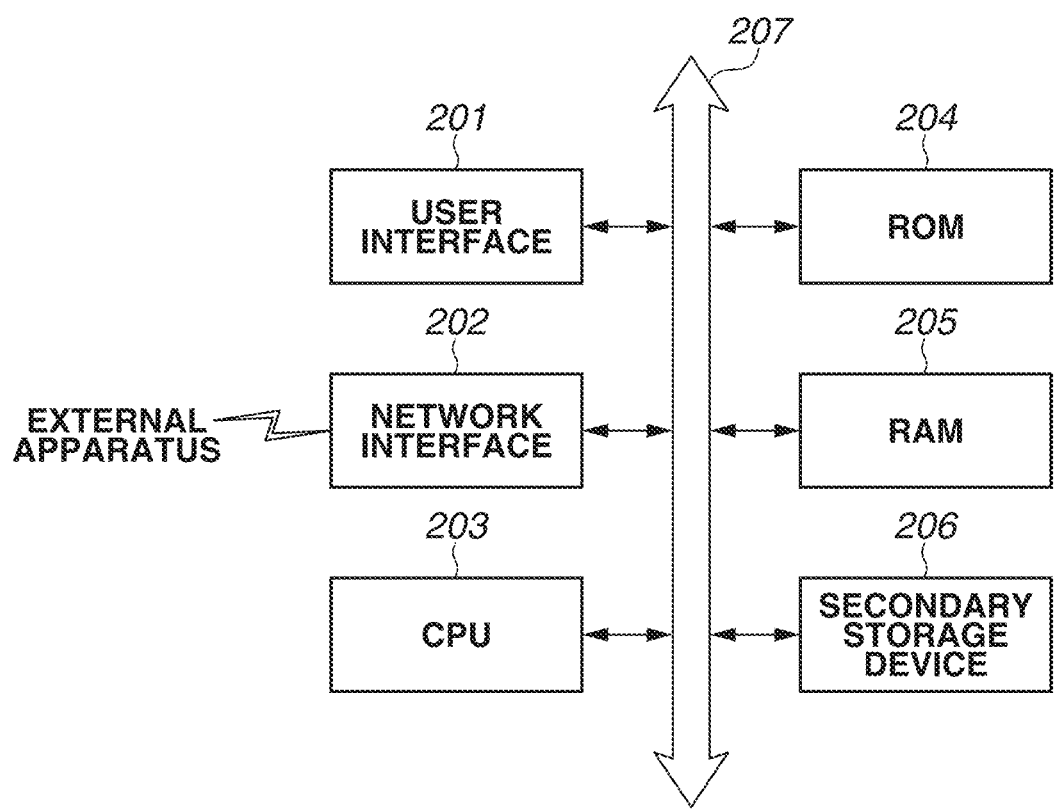
FIG. 2 illustrates an example of a hardware configuration for information processing functions.

FIG. 2 illustrates an example of a hardware configuration for information processing functions of the 3D printer 102 and the computers 104 and 105. A UI 201 inputs and outputs information and signals via a display, a keyboard, a mouse, a touch panel, and buttons. A computer not provided with such hardware can also be connected and operated from another computer via a remote desktop and a remote shell. A network interface 202 connects with a network such as a LAN to communicate with other computers and network devices. A read only memory (ROM) 204 is a storage device in which built-in programs and data are recorded. A random access memory (RAM) 205 is a temporary storage area. A secondary storage device 206 is a storage device typified by a hard disk drive (HDD) and a flash memory. A central processing unit (CPU) 203 executes a program read from the ROM 204, the RAM 205, and the secondary storage device 206. Each component is connected via an internal bus 207.

Figure 3:
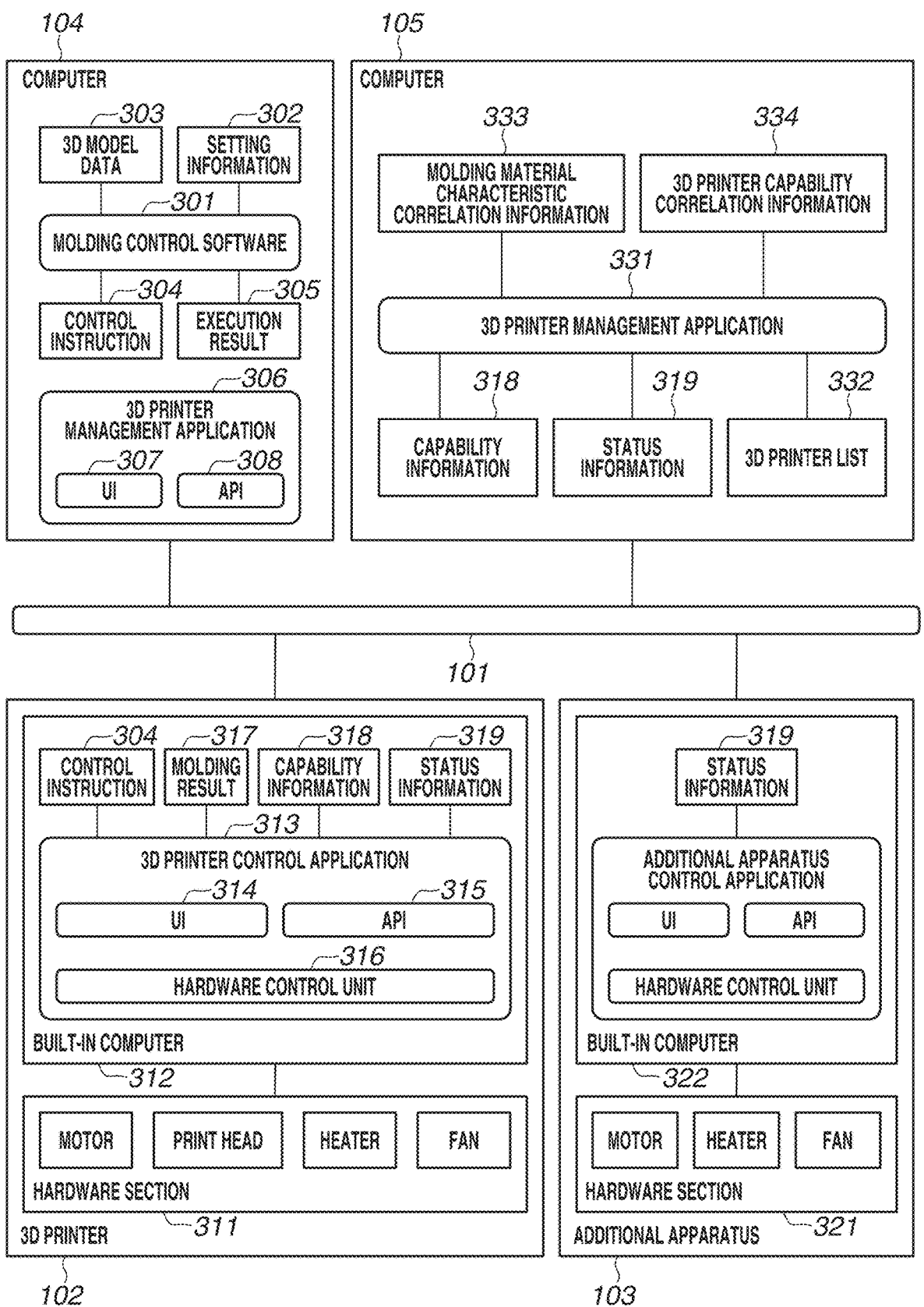
FIG. 3 illustrates an example of a software configuration and an example of a hardware configuration of the present system.

FIG. 3 illustrates a software configuration and a part of a hardware configuration of the present system. The configuration of the computer 104 will be described below.

Molding control software 301 is installed in and executed by the computer 104. The molding control software 301 includes, for example, functions for generating molding settings and control instructions related to molding called a slicer. A plurality of pieces of the molding control software 301 for supporting models and vendors of the 3D printers 102 may be installed in the computer 104. The computer 104 is able to download the molding control software 301 to the computer 105 via the network 101.

Setting information 302 includes molding-related setting items and the setting values for the molding control software 301. The molding-related setting items include, for example, the model name of a 3D printer to be used, the moving speed and temperature of the print head of the 3D printer, and type, color, name, and filling pattern of molding materials to be used.

3D model data 303 is three-dimensional model data for representing an object to be molded, in a three-dimensional shape. STL is an example file format for storing data representing a three-dimensional shape.

A control instruction 304 is a 3D printer control instruction generated by the molding control software 301 based on the 3D model data 303. For example, instructions for machine tools, called G-code, extended for 3D printers are widely used. The molding control software 301 generates not only control instructions related to molding of an object which is a molded portion represented by the 3D model data 303 but also control instructions related to molding of support structures required for molding. Support structures are molded as required to support an object currently being molded. An STL file does not include information related to molding of support structures. When an STL file is converted into G-code, information related to molding of support structures is added.

An execution result 305 is a result of processing performed on a molding result 317 (described below), sent from the 3D printer 102, by the molding control software 301. For example, the molding result 317 is converted into a format that is easy to be handled by the molding control software 301.

A 3D printer management application 306 is provided with a UI 307 and an application program interface (API) 308. The UI 307 can display such screens as the screens illustrated in FIGS. 8 and 9 (described below). The API 308 communicates with a 3D printer management application 331 of the computer 105 to receive screen data.

The 3D printer management application 306 may be added in the form of a plug-in program to general molding control software. Alternatively, the above-described functions can also be implemented by installing in the computer 104 another application (a program not illustrated) having a function of receiving data from the computer 105.

The configuration of the computer 105 will be described below.

The 3D printer management application 331 is executed on the computer 105. A 3D printer list 332 indicates a list of the 3D printers 102 subjected to management by the 3D printer management application 331. Molding material characteristic correlation information 333 summarizes the characteristics of molding materials usable for molding by the management target 3D printer 102 based on capability information 318. The molding material characteristic correlation information 333 will be described in detail below with reference to FIGS. 6A and 6B. 3D printer capability correlation information 334 summarizes the performance of the management target 3D printers 102 based on the capability information 318. The 3D printer capability correlation information 334 will be described in detail below with reference to FIG. 5.

By acquiring a 3D printer individual identifier (ID) from each 3D printer 102, the 3D printer management application 331 is able to distinguish acquired information for each 3D printer 102 and additional apparatus 103 even if there is a plurality of management targets of identical models. The 3D printer management application 331 constantly or periodically acquires various data from the management target 3D printers 102, the additional apparatuses 103, and the computer 104. Based on the acquired data, the 3D printer management application 331 updates the status information 319 and monitors whether there is any abnormal condition in the 3D printers 102 and the additional apparatuses 103.

The configuration of the 3D printer 102 will be described below.

A hardware section 311 is a hardware section of the 3D printer 102. The hardware section 311 configuring the 3D printer 102 depends on the molding method. Example molding methods include Fused Deposition Modeling (FDM), Stereo Lithography (STL), Selective Laser Sintering (SLS), and ink-jet method. In the case of FDM, the hardware section 311 includes, for example, a print head, a motor for driving the print head in the X-, Y-, and Z-axis directions, a heater for heating the nozzle of the print head, and a cooling fan.

A built-in computer 312 is a computer built into the 3D printer 102. The built-in computer 312 specializes in required functions and omits unnecessary functions, performance, and parts. Therefore, the built-in computer 312 is manufactured at low cost compared with general-purpose computers. Depending on the functions and performance required by the 3D printer 102, the built-in computer 312 may be replaced with a general-purpose computer.

A 3D printer control application (hereinafter referred to as a control application) 313 is executed on the built-in computer 312. The 3D printer control application 313 includes a UI 314, an Application Programming Interface (API) 315, and a hardware control unit 316. The UI 314 of a low-cost version includes a combination of a display for displaying several text lines and hardware operation buttons. The UI 314 of other version is, for example, a display with a touch panel. A user checks the state of the 3D printer 102 based on the display contents of the UI 314 and instructs the 3D printer 102 to perform desired processing by operating the UI 314. The API 315 transmits and receives instructions and data to/from the external computers 104 and 105. The external computers 104 and 105 transmit instructions to the 3D printer control application 313 via the API 315 to control the 3D printer 102.

Following instructions received via the UI 314 and the API 315 and instructions issued by the 3D printer control application 313 itself, the hardware control unit 316 operates each part of the hardware section 311 to output a molded object and perform preprocessing and postprocessing for output. The control instruction 304 generated by the molding control software 301 is sent to the 3D printer control application 313 via the network 101 and the API 315. The control instruction 304 generated by the computer 104 may be sent to the 3D printer control application 313 via the computer 105. When the 3D printer 102 is not provided with a network interface, the control instruction 304 can be sent to the 3D printer control application 313 via a storage device such as a universal serial bus (USB) memory. The 3D printer control application 313 interprets the control instruction 304 based on an output instruction from the UI 314 or the API 315, and the hardware control unit 316 operates each part of the hardware section 311 to output a molded object. The 3D printer control application 313 stores as the molding result 317 intermediate step of output of the molded object, final output result (successful/failed), start and end of job, and canceling and restarting time.

The molding control software 301 acquires the molding result 317 from the 3D printer 102, and the computer 104 confirms the result of molding by the 3D printer 102. The capability information 318 indicates functions that can be provided by the 3D printer 102. The capability information 318 includes definitions of ranges of speed and temperature of print head, types of molding materials, layer height (layer thickness), and molding capacity supported by the 3D printer 102. The status information 319 indicates the operating states of the 3D printer 102 and the additional apparatus 103. As the status information 319, the 3D printer 102 and the additional apparatus 103 respectively store the hardware status, alert information, and remaining amount of a molding material of the 3D printer 102.

The configuration of the additional apparatus 103 will be described below.

The additional apparatus 103 used to perform processing required before or after molding by the 3D printer 102 includes a hardware section 321. In addition to such hardware components as a motor, a heater, and a ventilation/cooling fan, the hardware section 321 of the additional apparatus 103 includes a nozzle for discharging a cleaning fluid and a pump (in the case of a cleaning apparatus) or a lamp for irradiating a molded object with ultraviolet rays (in the case of a curing apparatus) A built-in computer 322 is built into the additional apparatus 103. The built-in computer 322 includes an additional apparatus control application. Some additional apparatuses (not illustrated) are able to acquire apparatus information via the network 101, and other additional apparatuses (not illustrated) are unable to connect with other apparatuses. The 3D printer control application 313 may have functions of the additional apparatus control application.

As supplementary information, the above-described software configuration can be implemented based not only on the hardware configuration and arrangements according to the present exemplary embodiment. More specifically, each software component may be executed by any of hardware components including the built-in computer 312 of the 3D printer 102 and the computers 104 and 105. All the software components may be executed by one hardware component, or necessary software components may be executed by a plurality of hardware components.

Figure 4:
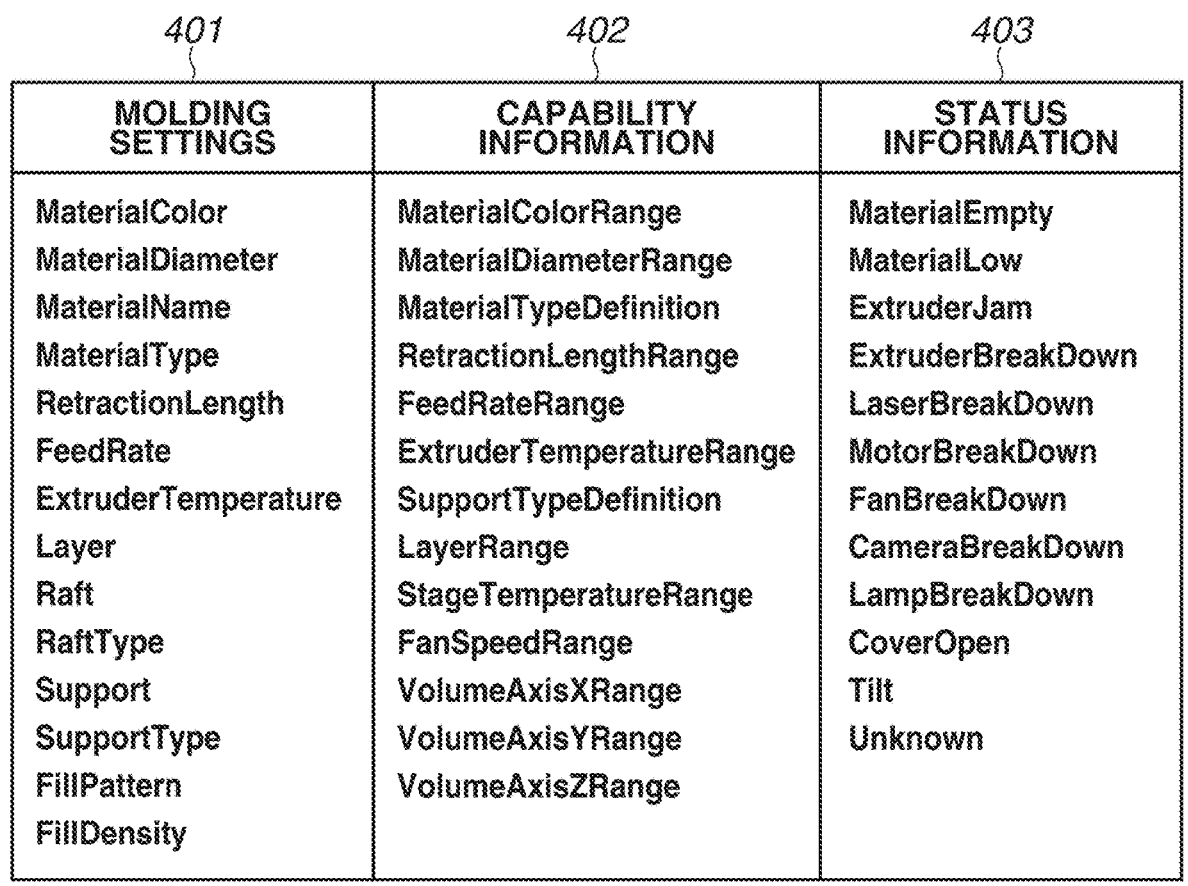
FIG. 4 illustrates example attributes included in information that can be acquired from a three-dimensional (3D) printer and an additional apparatus.

FIG. 4 illustrates example attributes and statuses included in the setting information 302, the capability information 318, and the status information 319. A molding setting 401 indicates example attributes included in the setting information 302 of a job set by the molding control software 301. Example attributes include color and type of molding material, moving speed and temperature of the print head, presence of existence of support structures, types of support structures when used, type of filling pattern, and filling density. The filling pattern refers to the shape of the internal structure of an object, and the filling density refers to the filling density of the internal structure of the object. The filling pattern and the filling density may be set not only on objects but also on support structures.

Capability information 402 indicates example attributes of the capability information that can be acquired when the capability information 318 can be acquired from the 3D printer 102. Example attributes include color and type of molding material usable for molding by the 3D printer 102, movable ranges of the print head in the X-, Y- and Z-axis directions, and rotational speed range of the fan. Status information 403 indicates example statuses that can be acquired when the status information 319 can be acquired. Examples statuses include insufficient remaining amount of molding material, clogged print head, defective fan, and open protective cover.

These attributes and status information may be included in an identical 3D printer 102 in a duplicated way. For example, when a multi-color molded object is output, a plurality of names and types of molding materials are to be specified in the setting information 302. Therefore, these attributes can be defined by using an array structure. The attributes and status information illustrated in FIG. 4 are only examples. Attributes to be actually used are not limited to the attributes illustrated in FIG. 4, and a data structure for defining attributes is not limited to any particular data structure.

FIG. 5 illustrates an example of the 3D printer capability correlation information 334 defined as a table. A 3D printer performance table 501 is generated based on the capability information 318 acquired from the 3D printer 102. A printer name 502 is the name of each 3D printer 102. A molding method 503 indicates a molding method for the 3D printer. The number of colors 504 indicates the number of colors of molding materials usable for one job. The 3D printer management application 331 determines the number of colors based on the number of print heads for discharging molding materials and the number of print heads for discharging coating materials. The value defined for the number of colors 504 is related to the behavior of radio buttons 811 and a drop-down list 812 illustrated in FIG. 8 (described below).

A molding speed 505 indicates the speed of molding. The molding speed 505 is an index indicating the fastest molding speed of each 3D printer calculated based on machine specifications such as the head moving speed supported by each 3D printer 102. The molding speed 505 depends on the molding method, i.e., whether the molding material is linearly output or planarly output, and the requisite time depends on the postprocessing. Thus, the molding speed 505 may be calculated by multiplying it by a coefficient according to the molding method. An accuracy 506 indicates the finishing accuracy of an object to be molded. The accuracy 506 is an index indicating the highest molding accuracy of each 3D printer calculated based on the layer height and the print head bore diameter supported by the 3D printer 102.

Since the method for stacking a molding material and applicable support structures differ for each molding method, the feeling of stacking differs for each molding method. Therefore, similar to the molding speed 505, the accuracy 506 may be calculated by multiplying it by a coefficient according to the molding method. A molding material 507 lists molding materials usable for molding by 3D printers 102, more specifically, names and codes of molding materials usable for molding by respective 3D printers 102.

The method for defining the value of each item in the 3D printer performance table 501 is not limited to the method illustrated in FIG. 5. For example, the molding method 503 may be defined by a numerical value indicating a molding method. The molding speed 505 and the accuracy 506 may be classified by threshold values. Numerical values in the 3D printer performance table 501 may be not absolute values but relative values from a certain reference value, or rankings among management target 3D printers 102.

FIGS. 6A and 6B illustrate examples of the molding material characteristic correlation information 333. The molding material characteristic correlation information 333 correlates molding materials with features of objects to be molded by using the respective molding materials. The use of this data enables determining molding materials suitable for features of an object desired by the user and presenting the molding materials.

FIG. 6A illustrates an example of a molding material master table 601 in which the characteristics of molding materials are defined for each item. A molding material name 602 indicates the name of each molding material. A strength 603 indicates the strength of an object molded by using the molding material. The value of the strength 603 varies according to the filling pattern and filling rate of the object. A larger value of the strength 603 indicates the higher strength.

A tactile feeling 604 indicates the tactile feeling of an object molded by using the molding material. For example, as tactile feeling of an object, tactile feelings 1, 2, 3, and 4 indicate "slick", "coarse", "smooth", and "slick and smooth", respectively. For example, "coarse" indicates a large value of the layer height and a coarse surface of an object, and "smooth" indicates a small value of the layer height and a smooth surface of an object. Further, "slick" indicates a slippy surface, for example, as a result of processing on the surface of the object. Thus, the tactile feeling 604 depends not only on molding materials but also on the layer height and the object surface processing method.

Resistances 605 indicate water resistance, heat resistance, and light resistance of the object molded by using the molding material. A color 606 indicates the color of the molding material. The color of molding material may be classified by the size of particles like the examples illustrated in FIG. 6A or may be strictly defined by the color code. A cost 607 indicates the cost for outputting the molding material. Although the molding material master table 601 is prepared in advance since the characteristics of molding materials are known, this table may be prepared by the user. Further, this table can be updated, for example, by using UIs of the 3D printer management application 331.

FIG. 6B illustrates an example of a molding material characteristic table 611. This table lists information of molding materials acquired from the molding material 507 and summarizes the characteristics of molding materials usable for molding by the management target 3D printer. A molding material name 612 is the name of each molding material acquired from the molding material 507. A strength 613 indicates the strength of the molding material acquired from the molding material master table 601 corresponding to the molding material name 612. Similar to the strength 613, a tactile feeling 614, resistances 615, a color 616, and a cost 617 are also acquired from the molding material master table 601. However, these values do not necessarily need to be identical to the values in the molding material master table 601.

Items in the molding material master table 601 and the molding material characteristic table 611 are not to be limited to the tables illustrated in FIGS. 6A and 6B, respectively. The number of items may be increased to define the characteristics of molding materials in more detail. The method for defining the value of each item in the molding material characteristic table 611 may be based on the classification of numerical values by threshold values. Numerical values in the molding material characteristic table 611 may not be absolute values but relative values from a certain reference value, or rankings among molding materials usable for molding.

FIG. 7 is a flowchart illustrating an example procedure for updating the 3D printer performance table 501 and the molding material characteristic table 611 of the 3D printer 102. Although the update processing is assumed to be periodically performed by the 3D printer management application 331, it may be performed at arbitrary time.

In step S701, the 3D printer management application 331 repetitively performs the following processing on the management target 3D printer 102. In step S702, the 3D printer management application 331 acquires the capability information 318 of the 3D printer 102. In step S703, based on the acquired capability information 318, the 3D printer management application 331 determines whether the acquired 3D printer 102 is a 3D printer not registered in the 3D printer performance table 501 (refer to FIG. 5). When the acquired 3D printer is a new 3D printer not registered (NO in step S703), the processing proceeds to step S704. On the other hand, when the acquired 3D printer is a registered 3D printer (YES in step S703), the processing proceeds to step S705.

In step S704, the 3D printer management application 331 calculates the performance based on the acquired capability information 318 and adds a new record to the 3D printer performance table 501. In step S705, the 3D printer management application 331 determines whether there is any difference between the acquired performance of the 3D printer 102 and the performance registered in the 3D printer performance table 501. When a setting is changed by the 3D printer or when the firmware is updated, a difference arises between the acquired and the registered performances. When there is a difference between the acquired and the registered performances (YES in step S705), the processing proceeds to step S706. On the other hand, when there is no difference between the acquired and the registered performances (NO in step S705), the 3D printer management application 331 repetitively performs the above-described processing on the next 3D printer 102.

In step S708, the 3D printer management application 331 updates the molding material characteristic table 611 (refer to FIG. 6B) based on the updated 3D printer performance table 501.

FIG. 8 illustrates an example of a screen UI for simplified settings. A simplified setting screen 801 allows the user to specify condition items. Based on condition specifications received via the screen 801, suitable 3D printers 102 are presented out of the management target 3D printers 102.

The screen 801 is provided via the UI 307 of the 3D printer management application 306 installed in the computers 104. This application may be an application specialized for the present system, or a web browser. A check box 802 is used to select whether to specify a 3D printer 102. When the check box 802 is checked, a management target 3D printer 102 can be specified.

A drop-down list 803 displays a list of the 3D printers 102 acquired from the 3D printer list 332. The drop-down list 803 is enabled when the check box 802 is checked. When a 3D printer 102 is selected from the drop-down list 803, search for 3D printers is possible. There may be a plurality of drop-down lists 803. A check box 804 is used to select whether to specify the 3D model data 303. When the check box 804 is checked, the 3D model data 303 to be molded is specified.

A text box 805 is used to specify the 3D model data 303. The text box 805 is enabled when the check box 804 is checked. A button 806 is used to refer to the 3D model data 303. The button 806 is enabled when the check box 804 is checked. When the button 806 is selected, a dialog box is activated allowing the user to specify the 3D model data 303. When the user specifies the 3D model data 303, the path in the computer 104 in which the 3D model data 303 is stored is displayed in the text box 805.

When reading a molding condition from a predefined profile, a radio button 807 is used to specify the profile. A drop-down list 808 is used to specify a profile. As an option, the usage of the molded object, such as mock-up, part, and tool can be specified. A profile customized by the user may be selected. A radio button 809 is used to specify a molding condition in terms of features of the molded object. The radio button 809 may be associated with the radio button 807 and either one of the radio buttons 807 and 809 can be selected. Alternatively, both buttons may be selected at the same time.

Radio buttons and check boxes 810 are used to specify condition items indicating features of the molded object. The radio buttons and check boxes 810 enable selecting at least one of the allowable accuracy, strength, tactile feeling, resistances, color, etc. of the object. The radio buttons and check boxes 810 may be such UIs as sliders that enable more finely specifying parameters. The radio buttons and check boxes 810 for specifying the molding condition items may be such UIs with which default values are specified by the profile specified by the drop-down list 808. Condition items indicating features of textures of the surface, such as the allowable accuracy and tactile feeling can also be specified by UIs other than the examples illustrated in FIG. 8.

Radio buttons 811 are used to specify monochrome or multi-color for the color of the molding material to be output. Drop-down lists 812 are used to specify the colors of the molding materials to be output. When multi-color is selected with one of the radio buttons 811, a plurality of colors can be specified by the drop-down lists 812.

A button 813 is used to delete the specified color. The button 813 is enabled when multi-color is specified by one of the radio buttons 811. A button 814 is used to add a color to be specified. When the button 814 is pressed, a drop-down list 812 is added allowing the user to specify an additional color. The button 814 is enabled when multi-color is specified by one of the radio buttons 811.

A button 815 is used to search for 3D printers 102 based on the specified molding condition. A 3D printer list 816 is a list of the 3D printers 102 displayed after selection of the button 815. The list 816 displays a list of 3D printers 102 conforming to the molding condition and their information. The list 816 does not necessarily need to be displayed on the screen and may be output, for example, to a CSV, XML, or JSON format file. The list 816 may be displayed on a screen other than the screen 801.

A 3D printer name 817 is the name of each 3D printer 102. A molding method 818 is the name of each molding method of the 3D printer 102 and is displayed based on the value acquired from the molding method 503 in the 3D printer performance table 501. A molding material 819 is the name of each molding material displayed based on the value acquired from the molding material name 612 in the molding material characteristic table 611.

A finishing 820 indicates the accuracy level of finishing of the object to be molded and is displayed based on the value acquired from the accuracy 506 in the 3D printer performance table 501. A requisite time 821 indicates the level of the molding time and is displayed based on the value acquired from the molding speed 505 in the 3D printer performance table 501. If the molding time can be calculated by the molding control software 301 when the 3D model data 303 is specified by the check boxes 804 and 805, the requisite time 821 may be numerically displayed.

A cost 822 indicates the level of the molding cost. Although, as described above, the cost 822 may be defined based on the molding material characteristic table 611 for each molding material, the cost 822 may be defined based on the 3D printer performance table 501 for each 3D printer because consumables such as support structures and cleaning fluids may be used depending on the molding method. A button 823 is used to open a detailed setting screen related to molding. When the button 823 is selected, screen UIs (described below with reference to FIG. 9) provided by the molding control software 301 are displayed. Alternatively, UIs of the molding control software 301 are activated. In the list 816, a part of the finishing 820, the requisite time 821, and the cost 822 of the object be displayed.

FIG. 8 illustrates an example of the present system, and the UI for search provided by the present system is not limited to the screen 801. For example, the radio buttons and check boxes 810 for specifying the molding condition items may be configured so that features of the molded object can be specified in more detail. Further, the number of items in the 3D printer list 816 can be increased.

FIG. 9 illustrates an example of a screen UI for detailed settings. A detailed setting screen 901 is a molding setting screen provided by the molding control software 301. The screen 901 allows the user to specify molding settings to be specified for molding by the molding apparatus. The contents of settings that can be specified on the screen 901 differ from the condition items indicating features of the completion image that can be specified on the screen 801 illustrated in FIG. 8.

A drop-down list 902 is used to specify a 3D printer 102 to be used. A text box 903 is used to specify the 3D model data 303. When the button 904 is pressed, a dialog box is activated allowing the user to specify the 3D model data 303. When the user specifies the 3D model data 303, the path in the computer 104 in which the 3D model data 303 is stored is displayed in the text box 903. Radio buttons 905 are used to specify a profile to which the resolution is to be output. A profile customized by the user can also be read.

Drop-down lists 906 are used to specify the types of molding materials to be used. When a plurality of molding materials can be simultaneously used for molding, a plurality of molding materials can be specified by the drop-down lists 906. Support structures can also be specified similarly as molding materials. Parameters 907 of attributes that can be set as molding settings. The control instruction 304 is generated based on the values set by the parameters 907. When the capability of the 3D printer 102 specified by the drop-down list 902 can be acquired, for example, values can be selected from the ranges supported by the 3D printer 102 specified based on the attributes indicated in the capability information 402. If the capability of the 3D printer 102 selected by the drop-down list 902 cannot be acquired, values will be selected from the ranges of the values defined by the molding control software 301.

A button 908 is used to start molding. The button 908 is disabled if any requisite value such as the 3D printer 102 and the 3D model data 303 is not input. When the button 908 is pressed, molding data will be generated by the molding control software 301 based on the contents specified on the molding setting screen 901 illustrated in FIG. 9. When the generated molding data is processed by the 3D printer 102, molding of the 3D object will be performed. When a Cancel button 909 is selected, the molding setting screen 901 closes.

According to the present exemplary embodiment, the molding setting screen 901 is assumed to be displayed mainly when the button 823 is selected. On the simplified setting screen 801 illustrated in FIG. 8, the setting values are determined based on the condition item specified for each attribute of the template in the setting information 302. When the determined setting values are transferred to the molding control software 301, the values set to the attributes of the setting information 302 are reflected when the molding setting screen 901 is displayed.

The molding setting screen 901 does not necessarily need to be displayed from the 3D printer search screen 801, and may be directly activated or displayed from other applications.

Figure 10:
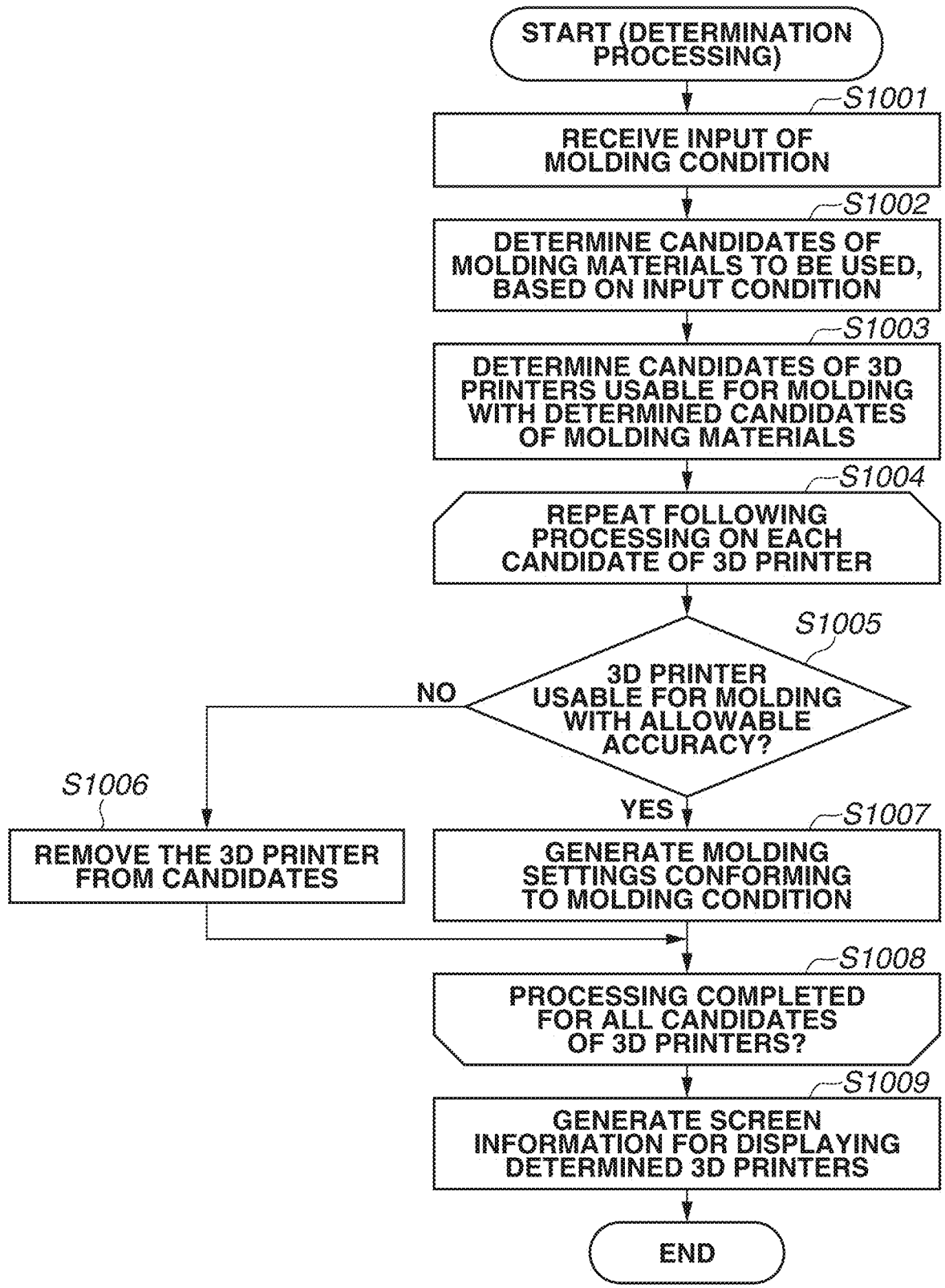
FIG. 10 is a flowchart illustrating an example procedure of determination processing.

FIG. 10 is a flowchart illustrating a series of processes in which the user inputs a molding condition and the 3D printer management application 331 displays suitable 3D printers according to the molding condition. In step S1001, the 3D printer management application 331 receives an input of a molding condition from the user via the screen 801. In this case, a search for the 3D 102 printers is also performed.

In step S1002, the 3D printer management application 331 searches for molding materials having the characteristics roughly satisfying the molding condition input by the user to determine candidates of molding materials. The method for determining candidates of molding materials is not limited to a particular method, and may be a generally known method such as the k neighborhood method. For example, values are set to the respective molding condition options, and a n-dimensional vector having molding condition items related to molding materials as feature amounts is generated. To obtain the similarity, the feature amounts are compared with the characteristics of the molding materials in the molding material characteristic table 611 vectorized at the same dimension as parameters. Thus, molding materials having the high similarity are determined as candidates. As the index of similarity, the Euclid distance with the calculation of the simple distance between vectors may be used. When weighting the characteristics of molding materials, the Mahalanobis distance may be used. In step S1002, when resistances and color of molding materials are specified as molding condition items on the screen 801, molding materials having the characteristics satisfying at least these condition items will be automatically selected as candidates.

In step S1003, the 3D printer management application 331 searches for at least one 3D printer 102 usable for molding by using the candidates of molding materials determined in step S1002. The information about molding materials usable for molding by each 3D printer 102 is stored in the molding material 507 in the 3D printer performance table 501. Therefore, the 3D printer management application 331 refers to the molding material 507 to determine candidates of the 3D printers 102.

In steps S1004 to S1008, the 3D printer management application 331 repetitively performs processing on each of the candidates of the 3D printers 102. In step S1005, the 3D printer management application 331 determines whether the candidate of the 3D printer 102 satisfies the level of the allowable accuracy specified in the molding condition. When the 3D printer management application 331 determines that the allowable accuracy is satisfied (YES in step S1005), the processing proceeds to step S1007. On the other hand, when the 3D printer management application 331 determines that the allowable accuracy is not satisfied (NO in step S1005), the processing proceeds to step S1006. The 3D printer management application 331 determines whether the allowable accuracy is satisfied, by presetting the values to the allowable accuracy options and determining whether the value of the accuracy 506 in the 3D printer performance table 501 reaches the threshold value of the selected allowable accuracy. In some cases, the accuracy 506 is defined not by a specific numerical value but by a level. Therefore, the 3D printer management application 331 may perform this determination by determining not whether the allowable accuracy reaches a strict threshold value but whether the allowable accuracy is equal to or greater than a certain level. To avoid all the candidates of the 3D printers 102 from being determined not to satisfy the selected accuracy, the 3D printer management application 331 may determine that candidates of the 3D printers 102 ranked high in the accuracy satisfy the allowable accuracy although the threshold value is not satisfied. Thus, the method for performing this determination is not limited to a particular method. In step S1006, the 3D printer management application 331 removes the 3D printer 102 not satisfying the allowable accuracy from the candidates.

In step S1007, the 3D printer management application 331 determines the 3D printer 102 as a candidate and generates the setting information 302 based on the molding condition selected by the user. More specifically, the moving speed and bore diameter of the print head for discharging molding materials and the layer height are determined according to the accuracy level, and the setting information 302 is generated. For example, when the strength is "robust", a large value (80% or higher) is determined as the setting value of the filling density, or a setting value (Honeycomb) indicating a pattern with which a large amount of molding material is used is determined as the filling pattern. When the strength is "robust", the setting value of such a molding material as a metal material and the setting value of the standard filling density (around 50%) are determined. In addition, when tactile feeling is "smooth", the setting value of the fine layer height (layer thickness) for molding material output is determined. Thus, according to features of the molded object specified as condition items, at least one molding setting, and types of molding material, molding apparatus, and molding method are determined.

In step S1009, the 3D printer management application 331 generates screen information for displaying at least one determined 3D printer 102 in the list 816 on the screen 801. The level of the finishing 820, the level of the requisite time 821, and the level of the cost 822 may be displayed with relative levels among the 3D printers 102 determined in steps S1004 to S1008. Alternatively, these levels may also be displayed with absolute levels by using the numerical values defined in the 3D printer performance table 501 and the molding material characteristic table 611.

The present exemplary embodiment has been described above centering on a mechanism for determining settings to be used for molding, such as selection of molding materials, according to features of the object desired to be molded by the user. Settings conforming to the condition specified by the user are determined by using the tables in which molding materials are correlated with features of the object to be molded by using the molding materials. According to the present exemplary embodiment, it is possible to determine settings to be used for molding suitable for features of the three-dimensional object desired to be molded by the user.

The first exemplary embodiment has been described above centering on a mechanism for determining the 3D printer 102 usable for molding conforming to the molding condition specified by the user. A second exemplary embodiment will be describe below centering on a mechanism for determining not only the 3D printer 102 but also the additional apparatus 103 together.

FIG. 11 illustrates an example of a UI when the 3D printers 102 are displayed together with the additional apparatuses 103. A screen 1100 includes screen UIs for 3D printer display according to the present exemplary embodiment. As illustrated in FIG. 11, the 3D printers 102 may be displayed on the simplified setting screen 801 illustrated in FIG. 8 or a screen different from the screen 801.

An icon 1101 presents that finishing will be improved as a result of comparison between a case where the apparatus included in the 3D printer 102 is used for postprocessing such as cleaning and a case where the additional apparatus 103 independent of the 3D printer 102 is used for postprocessing after molding. When finishing will be improved by using the additional apparatus 103, the 3D printer display screen 1100 displays not only 3D printers 102 as with the first exemplary embodiment but also combinations of the 3D printers 102 and the additional apparatuses 103.

Similar to the icon 1101, an icon 1102 presents that using the 3D printer 102 and the additional apparatus 103 together will improve the requisite time (increase the printing speed). An icon 1103 presents a case where using the 3D printer 102 and the additional apparatus 103 together will improve the level of a certain aspect but degrades the level of another aspect. For example, as illustrated in FIG. 11, when a dedicated cleaning apparatus is used, the level of finishing is improved but the cost of consumables including molding materials and support structures may rise because dedicated support structures need to be used.

Figure 12A:
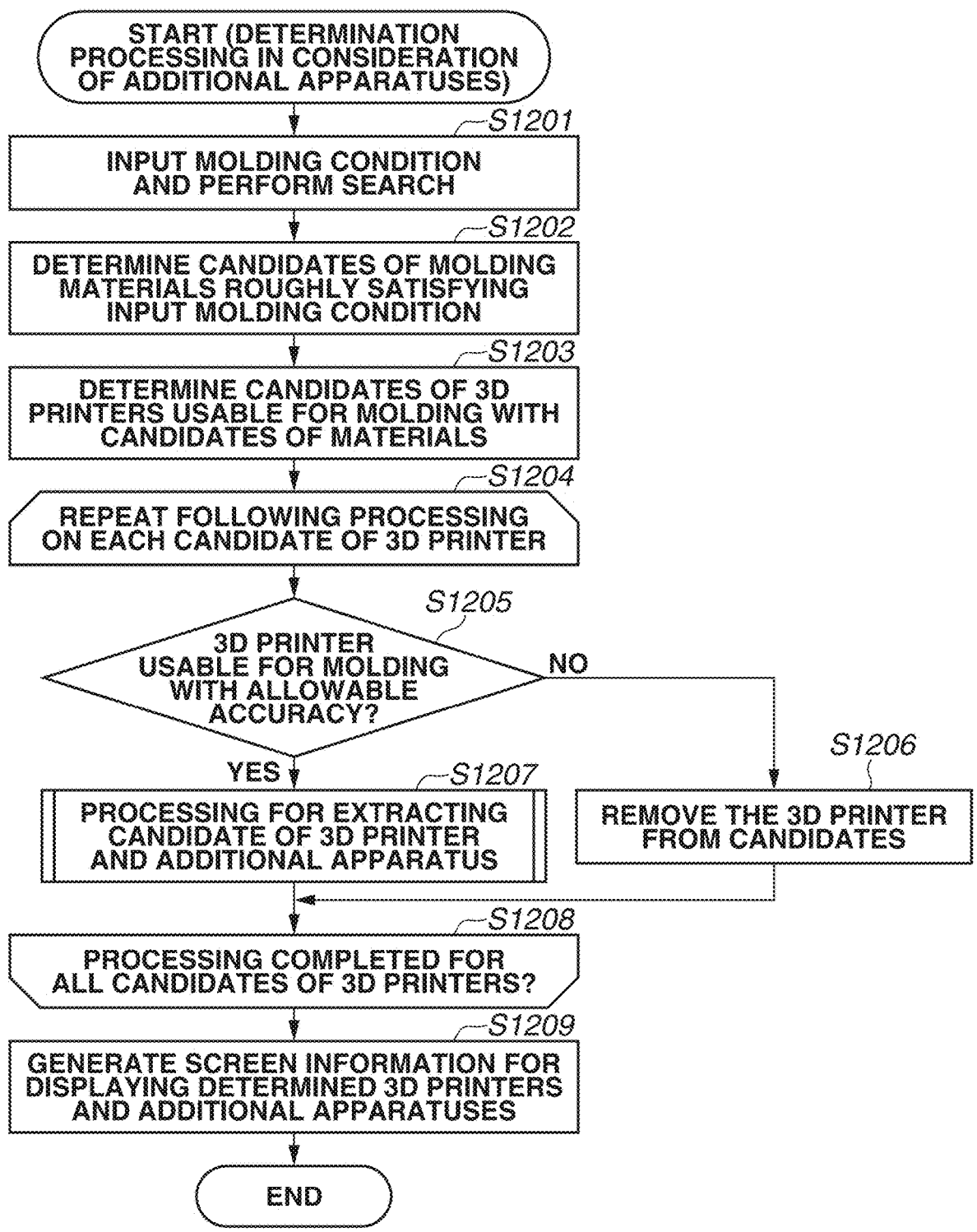
FIGS. 12A and 12B are flowcharts each illustrating example procedures of determination processing in consideration of additional apparatuses.
Figure 12B:
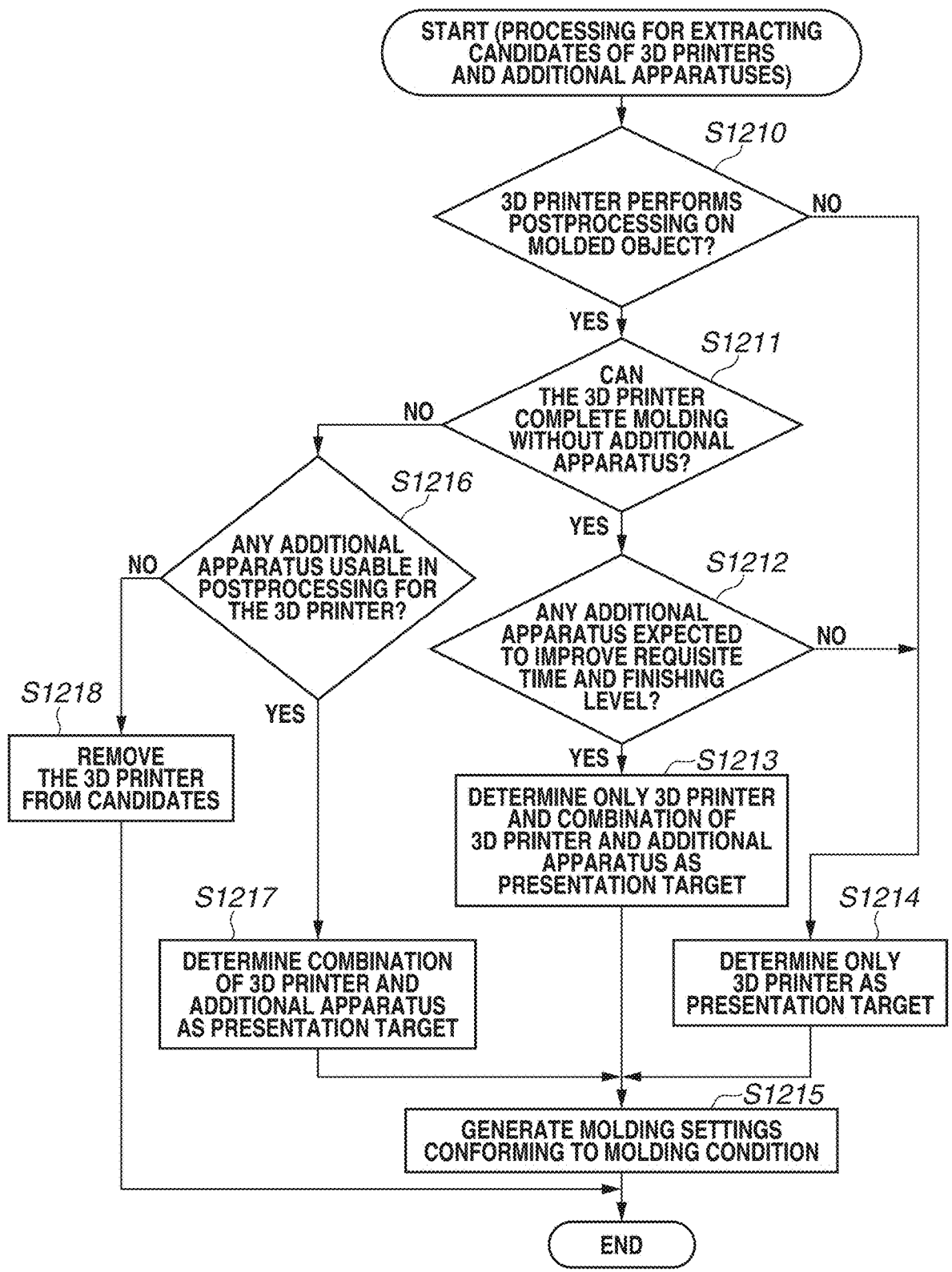

FIGS. 12A and 12B are flowcharts each illustrating example procedures of presenting the 3D printer 102 including the additional apparatus 103. In steps S1201 to S1206 and S1208, the 3D printer management application 331 performs similar processing to steps S1001 to S1006 and S1008, respectively, and redundant descriptions thereof will be omitted.

In step S1207, the 3D printer management application 331 extracts candidates of the 3D printer 102 and the additional apparatus 103. In step S1209, the 3D printer management application 331 generates screen information for displaying the 3D printers 102 and the additional apparatuses 103 on the screen 801 based on the candidates extracted in step S1207.

In step S1210, the 3D printer management application 331 determines whether the 3D printer 102 needs to perform postprocessing such as curing and cleaning. The 3D printer management application 331 performs this determination based on the molding method of the 3D printer 102. Alternatively, the 3D printer management application 331 may preset information about whether an additional apparatus 103 is required in the 3D printer performance table 501. When the 3D printer 102 needs to perform postprocessing (YES in step S1210), the processing proceeds to step S1211. On the other hand, when the 3D printer 102 does not need to perform postprocessing (NO in step S1210), the processing proceeds to step S1214.

In step S1211, the 3D printer management application 331 determines whether the 3D printer can complete molding without using the additional apparatus 103. When an additional apparatus integrated with the 3D printer 102 is used for postprocessing, molding can be completed without using the additional apparatus 103. The 3D printer management application 331 determines whether the additional apparatus 103 for postprocessing is required or whether the additional apparatus 103 integrated with the 3D printer 102 is usable. To allow the 3D printer management application 331 to perform this determination, related information is preset in the 3D printer performance table 501.

In step S1212, the 3D printer management application 331 determines whether using any additional apparatus 103 together with the 3D printer 102 will improve the level of a certain aspect. Combinations of the 3D printer 102 and the additional apparatus 103 that improve the level of a certain aspect are preset in the 3D printer performance table 501. When combining the 3D printer 102 and the additional apparatus 103 improves the level of a certain aspect (YES in step S1212), the processing proceeds to step S1213. Otherwise, when the combination does not improve or change the level of a certain aspect (NO in step S1212), the processing proceeds to step S1214.

In step S1213, the 3D printer management application 331 determines only the 3D printer 102 and the combination of the 3D printer 102 and the additional apparatus 103 as presentation targets. In step S1214, the 3D printer management application 331 determines only the 3D printer 102 as a presentation target. In step S1215, the 3D printer management application 331 generates the setting information 302 similar to step S1007.

In step S1216, the 3D printer management application 331 determines whether any additional apparatus 103 is usable for the 3D printer 102 that requires the additional apparatus 103 to complete molding. The 3D printer management application 331 may perform this determination based on the molding method of the 3D printer 102. Alternatively, the 3D printer management application 331 may preset information about which additional apparatus 103 is required or usable in the 3D printer performance table 501. When such an additional apparatus 103 exists (YES in step S1216), the processing proceeds to step S1217. On the other hand, when such as additional apparatus 103 does not exist (NO in step S1216), the processing proceeds to step S1218. In step S1217, the 3D printer management application 331 determines the combination of the 3D printer 102 and the additional apparatus 103 as a presentation target. In step S1218, the 3D printer management application 331 removes the 3D printer 102 currently performing repetitive processing from the candidates.

The present exemplary embodiment has been described above centering on a mechanism for determining not only the 3D printer 102 but also the additional apparatus 103 together as settings to be used for molding of the object desired to be molded by the user. In consideration of the difference in finishing of an object between a case where an additional apparatus 103 is used and a case where it is not used, the user is able to select a 3D printer 102 and an additional apparatus 103 according to features of the object desired to be molded by the user.

A third exemplary embodiment will be described below. There is a case where, depending on the specified 3D printer and 3D model data, some molding condition items that cannot be satisfied are known before search when the 3D printer 102 and the 3D model data 303 to be used are specified by the drop-down list 803 and the text box 805.

FIG. 13 illustrates an example of a UI on a (3D printer search) screen 801 in which molding condition items that cannot be satisfied when the 3D printer 102 and the 3D model data 303 are specified are prevented from being specified. For example, there is a case where the 3D printer specified by the drop-down list 803 is unable to output a molding material that satisfies "heat resistant" and "acid resistant" for "resistances" which is one of the molding condition items specified by the radio buttons and check boxes 810. There is a case where the 3D model data specified by the text box 805 describes that only one molding material will be used. In such a case, molding condition items that cannot be satisfied are grayed out to be disabled before search. Molding condition items 1301 are examples of such disabled items.

Figure 14A:
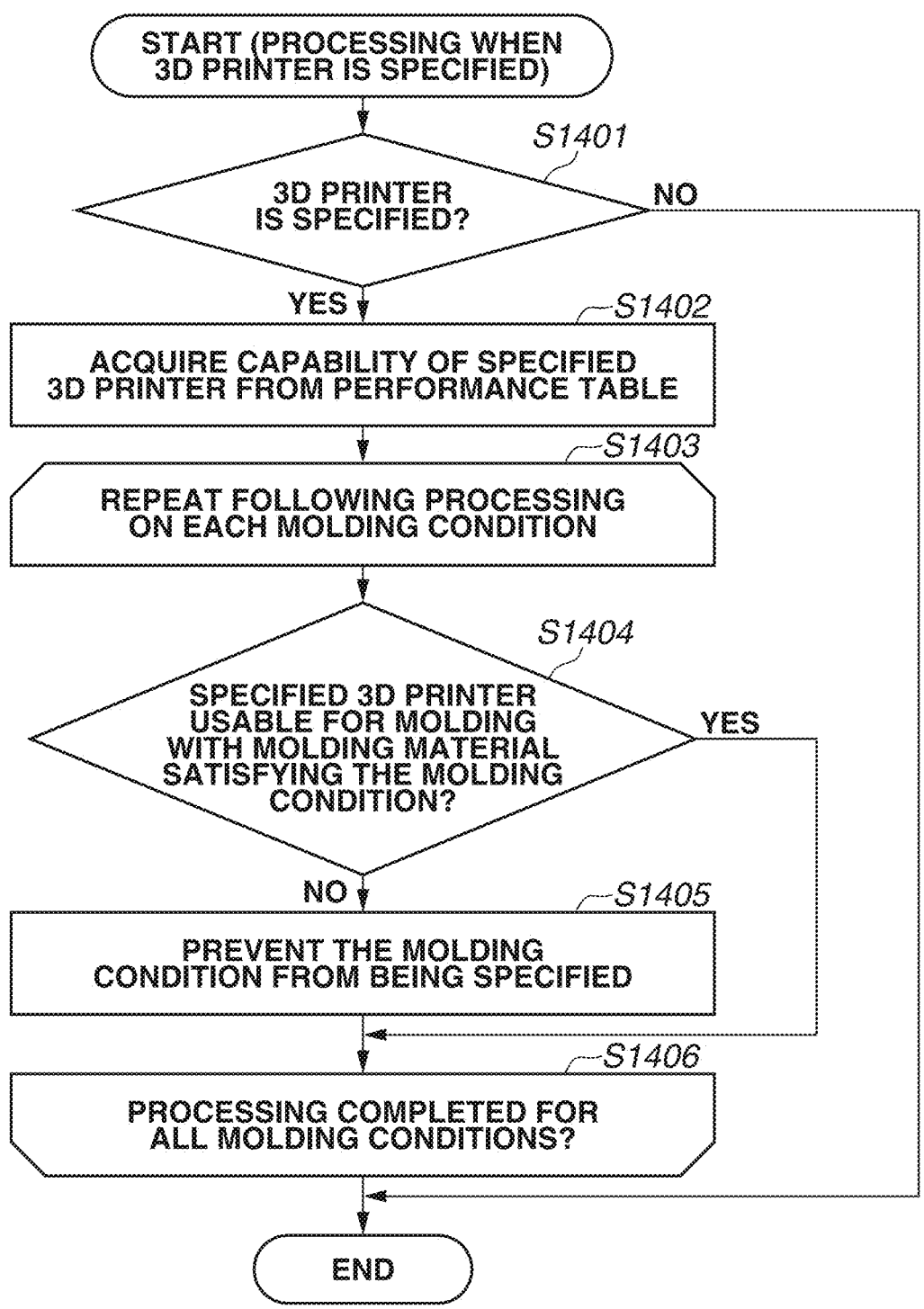
FIGS. 14A and 14B are flowcharts each illustrating example procedures of processing when a 3D printer or 3D model data is specified.
Figure 14B:
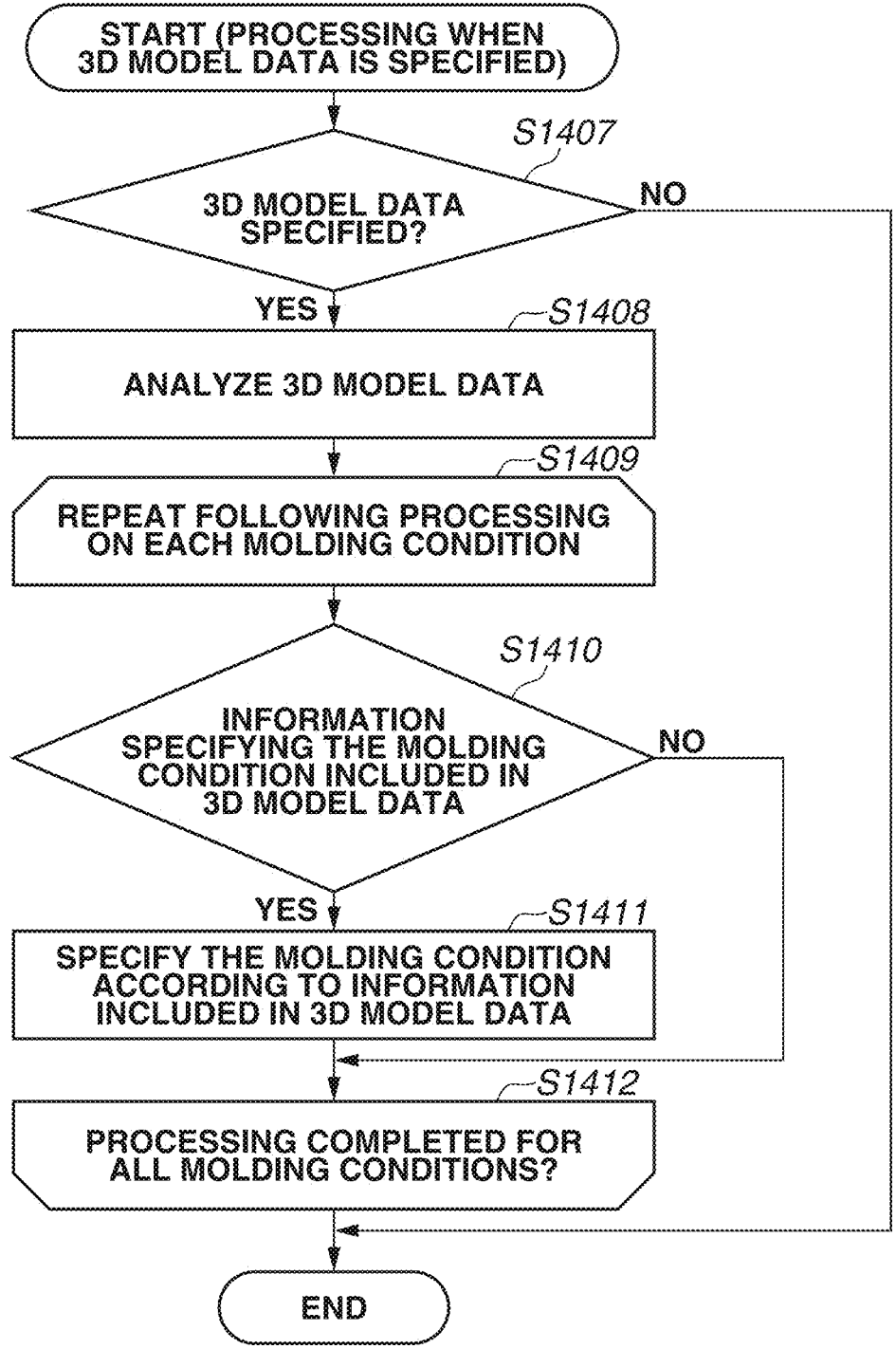

FIGS. 14A and 14B are flowcharts each illustrating a flow of processing when the 3D printer or the 3D model data is specified. This processing is performed to prevent specific molding condition items from being specified depending on the specified 3D printer 102 and the 3D model data 303. These pieces of processing are performed when the 3D printer and the 3D model data to be used are specified.

FIG. 14A is a flowchart illustrating a flow of processing when the 3D printer is specified. In step S1401, the 3D printer management application 331 determines whether the 3D printer 102 is specified on the screen 801. When the 3D printer 102 is specified (YES in step S1401), the processing proceeds to step S1402. On the other hand, when the 3D printer 102 is not specified (NO in step S1401), the processing exits this flowchart. In step S1402, the 3D printer management application 331 acquires the performance of the specified 3D printer 102 from the 3D printer performance table 501 managed by the 3D printer management application 331 itself.

The 3D printer management application 331 repetitively performs processing in steps S1403 to S1406 for each molding condition item that can be specified on the screen 801. In step S1404, the 3D printer management application 331 determines whether the 3D printer 102 specified by the user is usable for molding by using the molding materials which satisfy the molding condition items. When the 3D printer 102 is usable for molding (YES in step S1404), the processing proceeds to step S1406. The 3D printer management application 331 ends the current repetitive processing and repetitively performs the above-described processing for the following molding condition item. On the other hand, when the 3D printer 102 is not usable for molding (NO in step S1404), the processing proceeds to step S1405. The 3D printer management application 331 performs this determination by acquiring the molding materials corresponding to the specified 3D printer 102 from the molding material 507 in the 3D printer performance table 501 and determining whether these molding materials satisfy the molding condition items.

In step S1405, the 3D printer management application 331 prevents the molding condition items from being specified by the user, for example, by graying them out or not displaying them. This makes suitable setting and improves user's operability.

FIG. 14B is a flowchart illustrating a flow of processing when the 3D model data is specified. In step S1407, the 3D printer management application 331 determines whether the 3D model data 303 is specified. When the 3D model data 303 is specified (YES in step S1407), the processing proceeds to step S1408. On the other hand, when the 3D model data 303 is not specified (NO in step S1407), the processing exits this flowchart.

In step S1408, the 3D printer management application 331 analyzes the 3D model data 303. Although various data formats exist in the 3D model data 303, there is a case where the quality and color information of molding materials configuring 3D models may be set in the 3D model data 303.

The 3D printer management application 331 repetitively performs processing in steps S1409 to S1412 for each molding condition item that can be specified on the screen 801. In step S1410, the 3D printer management application 331 determines whether the specified 3D model data 303 includes information specifying the molding condition. As described above, the 3D model data includes settings of the quality and color information of molding materials to be output. When these pieces of information are set in the 3D model data 303 (YES in step S1410), the processing proceeds to step S1411. On the other hand, when these pieces of information are not set in the 3D model data 303 (NO in step S1410), the processing proceeds to step S1412. The 3D printer management application 331 repetitively performs the above-described processing for the following molding condition item.

In step S1411, the 3D printer management application 331 specifies the molding condition according to the information set in the 3D model data 303. For example, when the color information of the molding material to be output is set in the 3D model data 303, either one of the radio buttons 811 as a molding condition item is specified according to the setting information. Pieces of the 3D model data may or may not be supported depending on the molding method and the 3D printer 102. When the 3D model data 303 not supported by the 3D printer 102 is specified, a message that the 3D model data 303 is not supported by the 3D printer 102 specified by the drop-down list 803 may be displayed on the screen 801.

According to the present exemplary embodiment, when the user specifies a 3D printer 102 first, condition items which cannot be specified in relation to features of an object are disabled. According to the present exemplary embodiment, for a specific 3D printer 102, the user is able to suitably specify condition items indicating features of an object.

The third exemplary embodiment is applicable in combination not only with the first exemplary embodiment but also with the second exemplary embodiment.

Even if the 3D printers 102 conforming to molding condition items are presented as a result of a search for the 3D printers 102 by the present system, the presented 3D printer 102 may not be usable for molding because of a small remaining amount of a molding material or a hardware failure. A fourth exemplary embodiment will be described below centering on a method for changing the presentation contents according to the status information 319 of the 3D printer 102.

FIG. 15 illustrates an example of a UI on a (3D printer display) screen 801 in which the 3D printer 102 is displayed in consideration of the status information 319 of the 3D printer 102. An icon 1501 indicates that an alert occurred and that molding cannot be started unless a certain measure is taken. A tooltip 1502 displays a message indicating a measure to be taken for the 3D printer 102 with the alert occurrence. For example, the tooltip 1502 presents that the target 3D printer 102 has an insufficient remaining amount of a molding material and prompts the user to replenish the molding material. The message displayed in the tooltip 1502 may be separately displayed in a dialog or in the list 816. An icon 1503 means a more desirable status than usual at the time of molding. For example, the status information 319 of the 3D printer 102 is acquired at the time of search result presentation. The requisite time for warming up can be shortened if the temperature of the 3D printer 102 is within a normal range and close to the suitable temperature for molding. In that case, the requisite time for molding is assumed to be shortened, and therefore the icon 1503 is displayed.

Figure 16:
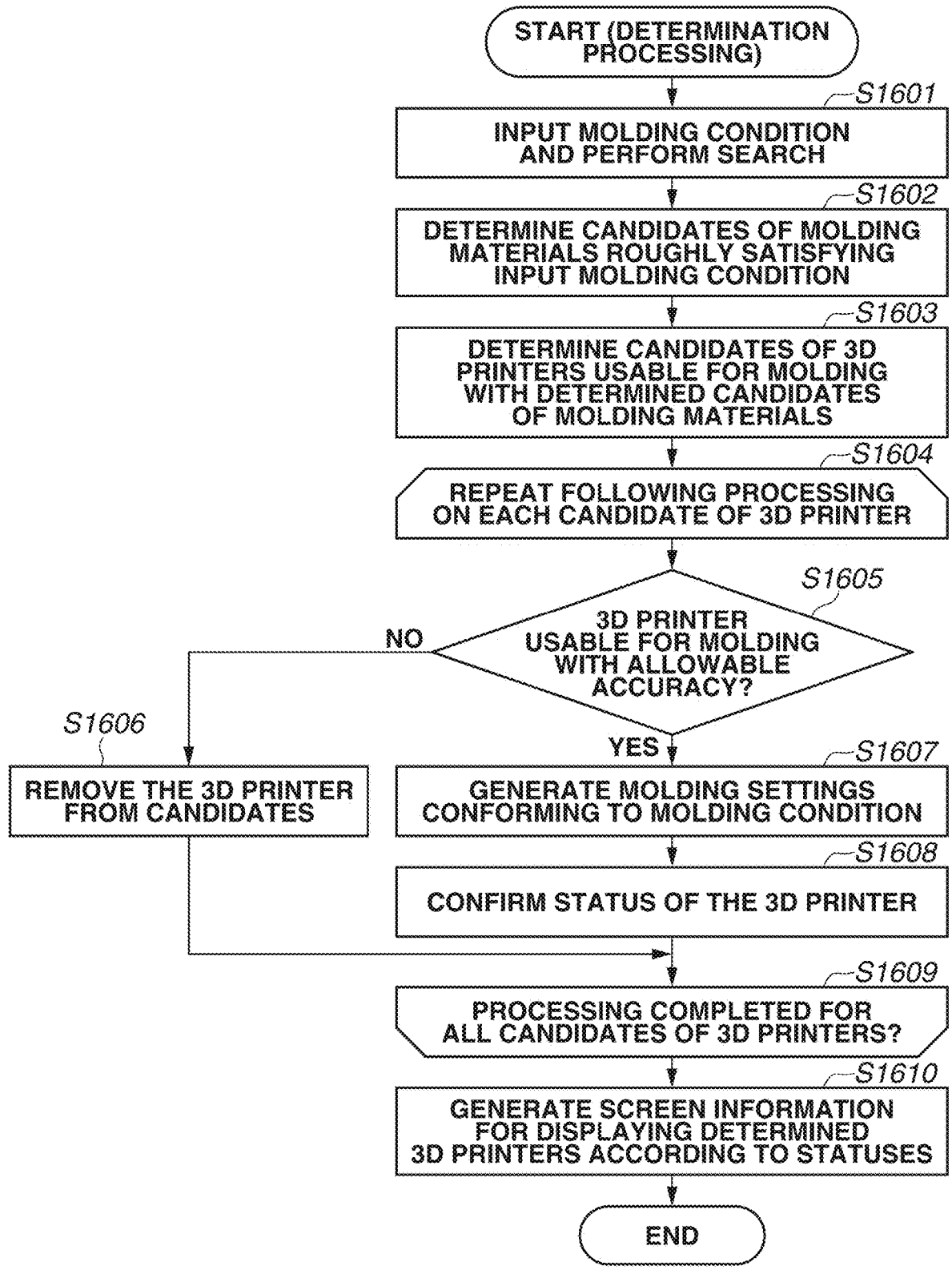
FIG. 16 is a flowchart illustrating an example procedure of determination processing in consideration of statuses.

FIG. 16 is a flowchart illustrating an example procedure of determining the 3D printers 102 in consideration of the status of the 3D printer 102. In steps S1601 to S1607, the 3D printer management application 331 performs similar processing to steps S1001 to S1007, and redundant descriptions thereof will be omitted. In step S1608, the 3D printer management application 331 confirms the status information 319 of the presentation target 3D printer 102. In step S1609, if the processing has been completed for all of the candidates of the 3D printers 102, the 3D printer management application 331 causes the processing to proceed to step S1610. In step S1610, according to the acquired status information 319 of the 3D printers 102, the 3D printer management application 331 changes the presentation contents as with the UIs illustrated in FIG. 15. Alerts for which no measure can be taken may not be displayed for candidates. In this case, the 3D printer management application 331 presets alert levels and performs filtering by the alert level at the time of presentation to determine whether to present each alert. Further, when the 3D printers 102 and the additional apparatuses 103 are presented together as with the second exemplary embodiment, the 3D printer management application 331 may change the display contents in consideration of not only the 3D printers 102 but also the status information 319 of the additional apparatuses 103.

According to the present exemplary embodiment, it is possible to determine the 3D printers 102 to be used for molding in consideration of the statuses of the 3D printers 102.

The fourth exemplary embodiment is applicable in combination not only with the first exemplary embodiment but also with the second and the third exemplary embodiments.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-012871, filed Jan. 26, 2016, which is hereby incorporated by reference herein in its entirety.

What is claimed is:

1. An information processing apparatus comprising:
a memory storing instructions;
and at least one processor executing the instructions causing the information processing apparatus to:

provide a first screen with simplified settings via which a plurality of condition items indicating features of a three-dimensional object are specified by a user, wherein the plurality of condition items includes at least two of a condition item indicating a strength-related feature of a three-dimensional object, a condition item indicating a resistance feature of a three-dimensional object and a condition item indicating one or more color features of a three-dimensional object;

receive, via the first screen from a user, specifications of the plurality condition items indicating features of an object desired to be molded by the user;

determine candidates of molding materials used for molding of the object desired to be molded by the user, based on the received specifications;

and set parameters for molding with a molding apparatus that cause molding of the object desired to be molded by the user with the received specifications, wherein the first screen for simplified settings includes an icon for displaying a second screen with detailed settings via which the parameters for molding with the molding apparatus are set by the user, wherein the condition item indicating the strength-related feature of the three-dimensional object and the condition item indicating the resistance features of the three-dimensional object provided in the first screen are not one of the parameters displayed in the second screen for molding set by the user, and wherein the set parameters used for the molding corresponds to a combination of a type of molding material, condition items, and molding settings for molding specified with respect to a specific molding apparatus.

2. The information processing apparatus according to claim 1, wherein the plurality of condition items further includes a condition item indicating a tactile feeling feature of a three-dimensional object.

3. The information processing apparatus according to claim 1, wherein the candidates of the molding materials are determined based on the received specifications by using a table in which molding materials are correlated with features of objects to be molded by using the molding materials.

4. The information processing apparatus according to claim 1,
wherein the instructions further cause the information processing apparatus to determine one or more molding apparatuses usable for molding using the determined candidates of the molding materials by using a table in which molding apparatuses are correlated with capability information indicating molding-related functions that can be provided by the molding apparatuses, and
wherein the parameter to be used for the molding are determined for each of the determined one or more molding apparatuses.

5. The information processing apparatus according to claim 1, wherein the determined parameter to be used for the molding includes at least any one of a plurality of molding settings including a shape of an internal structure of an object, a filling density of the internal structure of the object, a bore diameter of a head discharging a molding material, and a layer height indicating a stacking width of the molding material discharged from the head.

6. The information processing apparatus according to claim 1, wherein the first screen is provided to another information processing apparatus that is different from the information processing apparatus.

7. The information processing apparatus according to claim 1,
wherein, one of options corresponding to each usage of an object can be further specified via the first screen, and
wherein the parameter to be used for the molding is determined, based on both of the received specifications and the specification of one option.

8. The information processing apparatus according to claim 1, wherein the instructions further cause the information processing apparatus to provide a detailed setting screen for specifying molding settings for molding an object, the detailed screen being different from the first screen.

9. The information processing apparatus according to claim 1,
wherein the instructions further cause the information processing apparatus to provide a third screen for displaying the determined settings to be used for the molding, and
wherein, the third screen displays information about at least any one of a finishing accuracy, a molding time, and a molding cost of an object to be molded, regarding a molding apparatus used for the molding.

10. The information processing apparatus according to claim 9, wherein the third screen further displays information about at least any one of a finishing accuracy, a molding time, and a molding cost of an object to be molded, regarding the molding apparatus, in terms of a case where processing by an additional apparatus that performs processing on the object during or after molding is performed.

11. The information processing apparatus according to claim 1, wherein the instructions further cause the information processing apparatus to:
manage a status indicating an operating state of a management target molding apparatus, and
determine one or more molding apparatuses usable for molding based on the received specification and the status of the management target molding apparatus.

12. The information processing apparatus according to claim 11, wherein the instructions further cause the information processing apparatus to provide a third screen for performing a display for prompting the user to replenish a molding material in a case where a remaining amount of the molding material is not sufficient, regarding each of the determined one or more molding apparatuses.

13. A method for controlling an information processing apparatus, the method comprising:
providing a first screen with simplified settings via which a plurality of condition items indicating features of a three-dimensional object are specified by a user, wherein the plurality of condition items includes at least two of a condition item indicating a strength-related feature of a three-dimensional object, a condition item indicating a resistance feature of a three-dimensional object and a condition item indicating one or more color features of a three-dimensional object;
receiving, via the first screen from a user, specifications of the plurality condition items indicating features of an object desired to be molded by the user;
determining candidates of molding materials used for molding of the object desired to be molded by the user, based on the received specifications;
and setting parameters for molding with a molding apparatus that cause molding of the object desired to be molded by the user with the received specifications, wherein the first screen for simplified settings includes an icon for displaying a second screen with detailed settings via which the parameters for molding with the molding apparatus are set by a user, wherein the condition item indicating the strength-related feature of the three-dimensional object and the condition item indicating the resistance features of the three-dimensional object provided in the first screen are not one of the parameters displayed in the second screen for molding set by a user, and wherein the set parameters used for the molding corresponds to a combination of a type of molding material, condition items, and molding settings for molding specified with respect to a specific molding apparatus.

14. The method according to claim 13, wherein the plurality of condition items further includes a condition item indicating a tactile feeling feature of a three-dimensional object.

15. A non-transitory computer readable storage medium on which is stored a computer program for making a computer execute a control method for an information processing apparatus, the method comprising:

providing a first screen with simplified settings via which a plurality of condition items indicating features of a three-dimensional object are specified by a user, wherein the plurality of condition items includes at least two of a condition item indicating a strength-related feature of a three-dimensional object, a condition item indicating a resistance feature of a three-dimensional object and a condition item indicating one or more color features of a three-dimensional object;

receiving, via the first screen from a user, specifications of the plurality condition items indicating features of an object desired to be molded by the user;

determining candidates of molding materials used for molding of the object desired to be molded by the user, based on the received specifications;

and setting parameters for molding with a molding apparatus that cause molding of the object desired to be molded by the user with the received specifications, wherein the first screen for simplified settings includes an icon for displaying a second screen with detailed settings via which the parameters for molding with the molding apparatus are set by a user, wherein the condition item indicating the strength-related feature of the three-dimensional object and the condition item indicating the resistance features of the three-dimensional object provided in the first screen are not one of the parameters displayed in the second screen for molding set by a user, and wherein the set parameters used for the molding corresponds to a combination of a type of molding material, condition items, and molding settings for molding specified with respect to a specific molding apparatus.

16. The non-transitory computer readable storage medium according to claim 15, wherein the plurality of condition items further includes a condition item indicating a tactile feeling feature of a three-dimensional object.

17. The non-transitory computer readable storage medium according to claim 15, wherein the candidates of the molding materials are determined based on the received specifications by using a table in which molding materials are correlated with features of objects to be molded by using the molding materials.

18. The method according to claim 13, wherein the candidates of the molding materials are determined based on the received specifications by using a table in which molding materials are correlated with features of objects to be molded by using the molding materials.

* * * * *